United States Patent [19]
Cureton et al.

[11] Patent Number: 5,867,820
[45] Date of Patent: *Feb. 2, 1999

[54] FEEDLOT COMPUTER NETWORK INSTALLATION FOR MANAGING FEEDLOT OPERATIONS

[75] Inventors: J. Sam Cureton, Garden City, Kans.; Michael A. Ackerman, Windsor; James Carish, Denver, both of Colo.

[73] Assignee: Lextron, Inc., Greeley, Colo.

[*] Notice: The term of this patent shall not extend beyond the expiration date of Pat. No. 5,547,627.

[21] Appl. No.: 757,645

[22] Filed: Dec. 2, 1996

Related U.S. Application Data

[63] Continuation of Ser. No. 539,310, Oct. 4, 1995, abandoned, which is a continuation of Ser. No. 380,929, Jan. 31, 1995, Pat. No. 5,457,627, which is a continuation of Ser. No. 973,450, Nov. 9, 1992, abandoned.

[51] Int. Cl.⁶ ........................ G06F 17/60
[52] U.S. Cl. ........................ 705/1; 705/34
[58] Field of Search ........................ 395/201, 202, 395/203, 207, 208; 119/51.1, 51.02, 51.13, 52.1; 705/1, 7, 8, 34, 2–3

[56] References Cited

U.S. PATENT DOCUMENTS

| | | |
|---|---|---|
| 3,670,923 | 6/1972 | Hawes, Jr. et al. . |
| 3,806,001 | 4/1974 | Pratt . |
| 4,288,856 | 9/1981 | Linseth . |
| 4,461,241 | 7/1984 | Ostler . |
| 4,493,290 | 1/1985 | Gibbard . |
| 4,498,424 | 2/1985 | Leuschner . |
| 4,617,876 | 10/1986 | Hayes . |
| 4,712,511 | 12/1987 | ZamZow et al. . |
| 4,733,971 | 3/1988 | Pratt . |
| 5,008,821 | 4/1991 | Pratt et al. . |
| 5,069,165 | 12/1991 | Roussau . |
| 5,105,767 | 4/1992 | Gordon et al. . |
| 5,174,244 | 12/1992 | Gaalswyk . |
| 5,205,240 | 4/1993 | Colas et al. . |
| 5,219,224 | 6/1993 | Pratt . |
| 5,457,627 | 10/1995 | Cureton et al. ........................ 364/401 |

OTHER PUBLICATIONS

Gridcase 1500 Series, Technical Specifications, 286/386 Models, Grid Systems Corp. Fremont CA. 1988.

"High–Gain Goes High Tech", Betty Jo Geiger, Assoc. Editor, Reprinted From Calf News Cattle Feeder Magazine, Jul. 1991; Including Technical Bulletin From Info Tech, a Division of Walco International Inc. Dodge City, Kansas.

"Computers Ride the Range", Eric Brown & John Faulkner, Assistant Editor, PC World, vol. 2, Issue No. 5 pp. 238–246, May 1984.

"Red Wing Business Systems Package Tailored for Needs of Farmers", Computer Retail News; Products: Software; Special Report/ Vertical Software; p. 121, Nov. 19, 1984.

"Rations & Feedlot Monitoring", Carl L. Alexander, PHD for Dalex Computer Systems Inc; Computer Applications in Feeding & Management of Animals pp. 107–112; Madison Wisconsin, Nov. 12–15, 1984.

"Osu Feedlot (Fortran)", Donald R. Gill, Extension Animal Nutritionist, Animal Science Department of Oklahoma State Univ., Computer Applications in Feeding & Management of Animals; pp. 93–106; Stillwater, OK, Nov. 12–15, 1984.

"Homestead Management Systems" Feedlot Planner & Hog Planner, Wayne Forest, AgriComp Review, pp. 40–44 1985.

*Primary Examiner*—Robert A. Weinhardt
*Attorney, Agent, or Firm*—Hopgood, Calimafde, Kalil & Judlowe, L.L.p

[57] ABSTRACT

A computer network and method for feeding animals in a feedlot, in which discretion and direct control over the various suboperations of the feed ration assignment and delivery process are distributed among the individual operators in the system, while the feedlot manager is capable of indirectly monitoring the performance of the various suboperations.

3 Claims, 26 Drawing Sheets

| PEN SEQUENCE NUMBER | PEN NUMBER | CATTLE DEATH COUNT | FEED BUNK LENGTH | FEED LOT ZONE | LOT NUMBER IN PEN | HEAD COUNT | SEX | IN DATE | IN WEIGHT | CURRENT RATION TYPE | DAYS ON RATION | SUPPL. RATION TYPE | DAYS ON SUPPL. RATION |
|---|---|---|---|---|---|---|---|---|---|---|---|---|---|
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |
| 6 | | | | | | | | | | | | | |
| 7 | | | | | | | | | | | | | |
| ... | ... | | | | | ... | | | | | | ... | |
| N | | | | | | | | | | | | | |

FIG. 3

| TOTAL FEED RATION ASSGMT. | FIRST FEEDING CYCLE ||| SECOND FEEDING CYCLE ||| THIRD FEEDING CYCLE ||| |
|---|---|---|---|---|---|---|---|---|---|---|
| | FEEDING PRIORITY | FEED RATION TYPE | FEED RATION ASSGMT. | FEED RATION DISPENSED | FEEDING PRIORITY | FEED RATION TYPE | FEED RATION ASSGMT. | FEED RATION DISPENSED | FEEDING PRIORITY | FEED RATION TYPE | FEED RATION ASSGMT. | FEED RATION DISPENSED |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | ... ||| | ... ||| |
| | | | | | | | | | | | | |
| | | | | | | | | | | | | |

FIG. 3A

| FEED RATION TYPE | FEED RATION GROUP | SUPPLEMENT RATION INDICATOR | RATION INGREDIENTS SCHEDULE | DRY MATTER CONTENT PERCENT | ALTERNATE FEED RATION | SPLIT % FOR 1st FEEDING CYCLE | SPLIT % FOR 2nd FEEDING CYCLE | SPLIT % FOR 3rd FEEDING CYCLE |
|---|---|---|---|---|---|---|---|---|
| | | | | | | | | |
| | | | | | | | | |
| | | | | | | | | |
| | | | | | | | | |

FIG.4

| 1 | 2 | 3 | 4 | 5 | 6 | 7 | 8A | 9A | 10A | | | |
|---|---|---|---|---|---|---|---|---|---|---|---|---|
| | | | | | | | | DAY Nº 1 | | | DAY Nº 2 | |
| CATTLE MOVEMENT INDICATOR | PEN SEQUENCE NUMBER | HEAD COUNT | LOT NUMBER | SEX | IN DATE | IN WEIGHT | FEED RATION TYPE | FEED RATION ASSIGNED | FEED RATION DISPENSED | FEED RATION TYPE | FEED RATION ASSIGNED | FEED RATION DISPENSED |

FIG. 5

|   | DAY Nº. N | | |
|---|---|---|---|
|   | FEED RATION TYPE | FEED RATION ASSIGNED | FEED RATION DISPENSED |
|   |   |   |   |
|   |   |   |   |
|   |   |   |   |
|   |   |   |   |
|   |   |   |   |
|   | ⋮ | ⋮ | ⋮ |
|   |   |   |   |

FIG. 5A

| NAME OF FEED DELIVERY VEHICLE DRIVER | ASSIGNED NUMBER OF FEED DELIVERY VEHICLE DRIVER |
|---|---|
|  |  |
|  |  |
|  |  |
|  |  |
| ⋮ | ⋮ |

FIG.6A

| ASSIGNED NUMBER OF FEED DELIVERY VEHICLE | DESCRIPTION OF FEED DELIVERY VEHICLE | FEED DELIVERY VEHICLE LOAD CAPACITY (LBS.) |
|---|---|---|
|  |  |  |
|  |  |  |
|  |  |  |
|  |  |  |
| ⋮ | ⋮ | ⋮ |

FIG.6B

| DATE: _____ | ASSIGNED CHANNEL NUMBER | ASSIGNED CHANNEL FREQUENCY (Hz) |
|---|---|---|
| FEEDLOT MANAGEMENT COMPUTER SYS. |  |  |
| FEEDBUNK READING COMPUTER SYSTEM |  |  |
| FEEDMILL COMPUTER SYSTEM |  |  |
| NUTRITION COMPUTER SYSTEM |  |  |
| VETERINARIAN COMPUTER SYSTEM |  |  |
| FEED DELIVERY VEHICLE COMPUTER SYS. |  |  |
| ⋮ | ⋮ | ⋮ |
|  |  |  |

FIG.7

| DATE: | PHYSICAL FEEDING CYCLE № 1 | | | | | | | | | REQUEST/DISABLE CONDITION FOR FILE RETRANSMISSION | | |
|---|---|---|---|---|---|---|---|---|---|---|---|---|
| /1 /2 /3 | /4 | /5 | /6 | /7 | /8 | /9 | /10 | /11 | | | | |
| ZONE NUMBER / PEN SEQUENCE NUMBER / PEN NUMBER | HEAD COUNT | SEX | LOT NUMBER | FEED BUNK LENGTH | FEEDING PRIORITY | FEED RATION ASSGMT. | FEED RATION DISPENSED | FEED RATION TYPE | | | | |
| | | | | | | | | A | | | | |
| | | | | | | | | A | | | | |
| | | | | | | | | A | | | | |
| | | | | | | | | A | | | | |
| | | | | | | | | A | | | | |
| | | | | | | | | B | | | | |
| | | | | | | | | B | | | | |
| | | | | | | | | B | | | | |
| | | | | | | | | B | | | | |
| ... | ... | ... | ... | ... | ... | ... | ... | ... | | | | |
| | | | | | | | | E | | | | |
| | | | | | | | | E | | | | |
| | | | | | | | | E | | | | |
| | | | | | | | | E | | | | |

FIG. 8

| DATE: /1 | PHYSICAL FEEDING CYCLE №.1 | | | | | | | | RATION GROUP A | | | RATION GROUP B | | | | ... | RATION GROUP E | |
|---|---|---|---|---|---|---|---|---|---|---|---|---|---|---|---|---|---|---|
| | /2 | /3 | /4 | /5 | /6 | /7 | /8 | /9 | /10 | | /11 | | | | | | | |
| ZONE NUMBER | PEN SEQUENCE NUMBER | PEN NO. | HEAD COUNT | LOT NO. | FEED DELIVERY VEHICLE I.D. | FEED DELIVERY VEHICLE DRIVER I.D. | FEED RATION ASSIGNMENT | FEED RATION TYPE | TOTAL LOAD ASSIGNED (LBS.) | TOTAL LOAD DISPENSED (LBS.) | TOTAL WEIGHT OF ASSIGNED LOAD №.1 | TOTAL WEIGHT OF DISPENSED LOAD №.1 | TOTAL WEIGHT OF ASSIGNED LOAD №.2 | TOTAL WEIGHT OF DISPENSED LOAD №.2 | TOTAL WEIGHT OF FEED LOAD №.3 | TOTAL WEIGHT OF DISPENSED LOAD №.3 | TOTAL WEIGHT OF ASSIGNED LOAD №.4 | TOTAL WEIGHT OF DISPENSED LOAD №.4 | ... | TOTAL WEIGHT OF ASSIGNED LOAD №.60 | TOTAL WEIGHT OF DISPENSED LOAD №.60 |
| | | | | | | | | A | | | | | | | | | | | | | |
| | | | | | | | | A | | | | | | | | | | | | | |
| | | | | | | | | A | | | | | | | | | | | | | |
| | | | | | | | | A | | | | | | | | | | | | | |
| | | | | | | | | A | | | | | | | | | | | | | |
| | | | | | | | | B | | | | | | | | | | | | | |
| | | | | | | | | B | | | | | | | | | | | | | |
| | | | | | | | | B | | | | | | | | | | | | | |
| | | | | | | | | B | | | | | | | | | | | | | |
| | | | | | | | | E | | | | | | | | | | | | | |
| | | | | | | | | E | | | | | | | | | | | | | |
| | | | | | | | | E | | | | | | | | | | | | | |
| | | | | | | | | E | | | | | | | | | | | | | |

FIG.9

| | |
|---|---|
| NEXT UNASSIGNED PEN NUMBER | |
| AVAILABLE FEED DELIVERY VEHICLE IDENTIFICATION NUMBER | |
| IDENTIFICATION NUMBER OF THE DRIVER OF AVAILABLE FEED DELIVERY VEHICLE | |
| MAXIMUM LOAD CAPACITY OF AVAILABLE FEED DELIVERY VEHICLE | |

FIG.9B

| FEEDING CYCLE NUMBER | DRIVER NUMBER | NUMBER OF FEED DELIVERY VEHICLE | |
|---|---|---|---|
| PEN NUMBER | FEED RATION TYPE | FEED RATION ASSIGNMENT | FEED RATION DISPENSED |
| | | | |
| | | | |
| | | | |
| | | | |
| | | | |
| | | | |
| | | | |
| | | | |
| ⋮ | ⋮ | ⋮ | ⋮ |
| | | | |
| | | | |
| | | | |
| | | | |

FIG.10

| DATE: | | | |
|---|---|---|---|
| CATTLE MOVE-MENT TYPE | FROM LOT N°. / FROM PEN N°. | TO LOT N°. / TO PEN N°. | HEAD COUNT |
| | | | |
| | | | |
| ⋮ | ⋮ | ⋮ | ⋮ |
| | | | |

FIG.11

| DATE OF MOVEMENT | FROM PEN N°. | FROM LOT N°. | HEAD COUNT | TO PEN NUMBER | TO LOT NUMBER |
|---|---|---|---|---|---|
| DAY N°.1 | | | | | |
| DAY N°.2 | | | | | |
| ⋮ | ⋮ | ⋮ | ⋮ | ⋮ | ⋮ |
| DAY N°.N | | | | | |

FIG.12

| DATE OF BILLING: | | | | | |
|---|---|---|---|---|---|
| PEN NUMBER | LOT NUMBER | RATION TYPE | FEED RATION DISPENSED (i.e. FED) | COST OF RATION AMOUNT/POUND | TOTAL COST OF RATION DISPENSED |
| | | | | | |
| | | | | | |
| | | | | | |
| ⋮ | ⋮ | ⋮ | ⋮ | ⋮ | ⋮ |
| | | | | | |

FIG.13

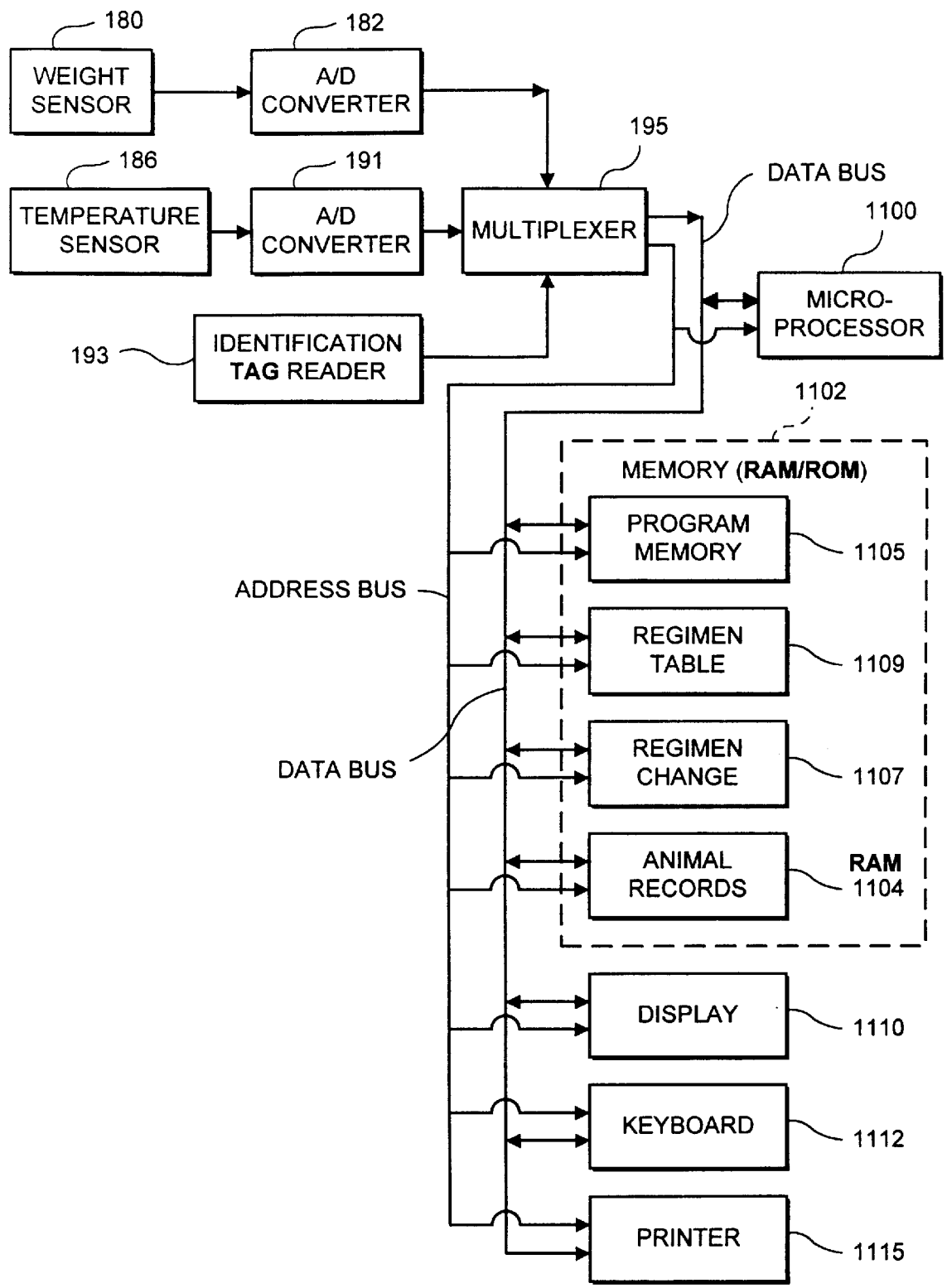
F I G. 20

FEEDLOT COMPUTER NETWORK INSTALLATION FOR MANAGING FEEDLOT OPERATIONS

RELATED CASE

This is a Continuation of application Ser. No. 08/539,310 entitled "COMPUTE NETWORK AND METHOD FOR FEEDING ANIMALS IN A FEEDLOT USING THE SAME" filed Oct. 4, 1995 now abandoned; which is a Continuation of application Ser. No. 08/380,929 filed Jan. 31, 1995, now U.S. Pat. No. 5,457,627 issued Oct. 10, 1995, which is a Continuation application Ser. No. 07/973,450 filed Nov. 9, 1992, now abandoned.

BACKGROUND OF INVENTION

1. Field of Invention

The present invention relates generally to a computer-network and method for feeding animals in a feedlot, in which discretion and direct control over the various suboperations of the feed ration assignment and delivery process are distributed among the individual operators in the system, while the feedlot manager is capable of indirectly monitoring the performance of the various suboperations.

2. Brief Description of the Prior Art

In modern times, commercial feedlots are used extensively to feed thousands of head of cattle or other animals at various stages of growth. The major reason for using an animal feedlot rather than the "open range" to feed cattle, is to expedite the cattle growth process and thus be able to bring cattle to the market in a shorter time period.

Within an animal feedlot, cattle are physically contained in cattle pens, each of which has a feedbunk to receive feed. Ownership of cattle in the feedlot is defined by unique lot numbers associated with the group(s) of cattle in each pen. The number of cattle in an owner's lot can vary and may occupy a fraction of or one or more cattle pens. Within a particular pen, cattle are fed the same feed ration, (i.e. the same type and quantity of feed). In order to accommodate cattle at various stages of growth or which require special feeding because they are sick, undernourished or the like, the feedlot comprises a large number of pens.

Generally, feeding cattle in a feedlot involves checking daily each pen to determine the ration quantity to be fed to the cattle therein at each particular feeding cycle during that day, the condition of the cattle, and the condition of the pen. At a feedmill, feed trucks are then loaded with appropriate quantities of feed for delivery during a particular feeding cycle. Thereafter, the loaded feed trucks are driven to the feedbunks and the assigned ration quantity for each pen is dispensed in its feedbunk. The above process is then repeated for each designated feeding cycle. Owing to the large number of feed ration quantities assigned for delivery each day in the feedlot, feeding animals in a large feedlot has become an enormously complex and time-consuming process.

It is well known in the art to use computers to simplify feedlot management operations.

In their 1984 PC World article "Computers Ride The Range", Eric Brown and John Faulkner explain that large feedlots were the first cattle operations to utilize computers in order to simplify calculations on feed, cattle movements, payroll and accounting, invoicing and least-cost feed blending. From such calculations, market projections, "break-even prices" on any given head of cattle, and analyzable historical records can be easily created while permitting feedlot managers to keep track of virtually all overhead costs, from labor and equipment costs, down to the last bushel of corn or gram of micronutrients. Computer systems of the above type are generally described in the articles: "Homestead Management Systems° Feedlot Planner and Hay Planner" by Wayne Forest, published on pages 40–44 of the Sep. 1985 issue of Agricomp magazine; and "Rations and Feedlot Monitoring" by Carl Alexander, published on pages 107–112 of Computer Applications in Feeding and Management of Animals, November 1984. The use of computer systems to simulate and thus predict the growth process of cattle in a feedlot is disclosed in the article "OSU Feedlot (Fortran)" by Donald R. Gill, on pages 93–106 of Computer Applications in Feeding and Management of Animals, supra.

It is also well known to use portable computing equipment in order to facilitate the assignment and delivery of feed rations in a feedlot.

For example, U.S. Pat. No. 5,008,821 to Pratt et al. discloses one prior art system in which portable computers are used in feed ration assignment and delivery operations. However, while this prior art computer system seeks to substantially eliminate the need for handwritten notes and feed cards through the use of portable computers during the feed ration assignment and delivery process, it suffers from a number of shortcomings and drawbacks. Specifically, this prior art system and method requires that the feedbunk reader assign particular feedtrucks and drivers to deliver specified loads of feed to specified sequences of pens along a prioritized feed route during each physical feeding cycle. Thus, the amount of feed to be loaded onto each assigned feed truck must be predetermined by the feedbunk reader in advance of commencing feed delivery operations. Consequently, this prior art method of feed ration assignment and delivery requires the feedbunk reader and his computer (i) be physically present at the feedmill during feed truck loading operations, or (ii) to produce load printouts (e.g. cards) prior to commencing feed ration delivery operations.

In short, by directly controlling the "feed load" assignment process in prior art systems, the feedbunk reader has been unnecessarily constrained within the feedlot, and consequently, prevented from performing tasks more suitable to his knowledge and skill such as, for example, determining the type and quantity of ration to be fed to animals, determining the condition of cattle and pens, and the like.

Thus, there is a great need in the feedlot management art for an improved system and method for assigning and delivering feed rations to animals in a feedlot.

OBJECTS AND SUMMARY OF PRESENT INVENTION

Accordingly, it is a primary object of the present invention to provide a computer-assisted method and apparatus for feeding animals in a feedlot in a manner which overcomes the problems associated with prior art systems and methodologies.

It is a further object of the present invention to provide such apparatus in the form of a computer network which liberates the feedbunk reader from specifying feed load assignments, without surrendering supervisory control over the quality of performance exercised in delivering assigned feed rations to animal pens in the feedlot.

A further object of the present invention is to provide such a computer network having a plurality of computer systems, linked together in a telecommunication network.

It is a further object of the present invention to provide a computer-assisted method of assigning and delivering feed rations in a feedlot, in which feed load assignments to feed delivery vehicles are determined at the feedmill in a manner independent of the feedbunk reader and feedlot manager.

It is a further object of the present invention to provide such a computer-assisted method of feed ration assignment and delivery, in which (i) the feedbunk reader uses a feedbunk reading computer system to create a feed delivery file containing feed ration delivery data for each pen along a prioritized route during each particular feeding cycle, and (ii) the feedmill operator uses a feedmill computer system to display the data in a feed load assignment file in order to specify the total amount of feed ration to be loaded onto each assigned feed ration delivery vehicle and the subsequence of pens along the prioritized feeding route to which the assigned feed rations are to be delivered.

It is a further object of the present invention to provide such a computer-assisted method of feed ration assignment and delivery, in which each feed delivery vehicle includes a feed delivery vehicle computer system operably connected to its scale, for receipt and storage of actual feed dispensed data produced thereby.

It is a further object of the present invention to provide such a computer-assisted method of feed ration assignment and delivery, in which the assigned amount of feed ration to be delivered to each pen along the specified pen subsequences is displayed from the feed delivery vehicle computer system, and the actual amount of feed uniformly delivered to each pen is weighed by the scale and recorded in a feed ration dispensed file created in the feed delivery vehicle computer system during each particular feeding cycle.

A further object of the present invention is to provide such a computer-assisted method of feed ration assignment and delivery, in which the feed ration dispensed file in each feed delivery vehicle computer system is transmitted to the feedbunk reading computer system after completion of each feeding cycle, and after the last feeding cycle has been completed, a feed delivery performance report on each of the feed delivery vehicle operator is produced by a feedlot management computer system for review by the feedlot manager.

A further object of the present invention is to provide such a computer-assisted method of feed ration assignment and delivery, in which the computer system at the feedmill creates a feed load assignment file containing (i) feed load assignment data specifying the amount of feed ration actually loaded onto each feed delivery vehicle during each particular feeding cycle, and also (ii) the specified subsequence of pens along the prioritized feeding route which have been assigned to each feed delivery vehicle for delivery.

Yet a further object of the present invention is to provide a feedlot computer network in which separate computer systems, adapted for the feedbunk reader, the feedmill operator, the feedlot manager, the feedlot veterinarian, the feedlot nutritionist and the feed delivery vehicle operators, are integrated within a single telecommunication network which permits them to selectively transfer data files therewithin in order to carry out the method of the present invention.

These and other objects of the present invention will become apparent hereinafter.

BRIEF DESCRIPTION OF THE DRAWINGS

For a more complete understanding of the objects of the present invention, the Detailed Description of the Illustrative Embodiments thereof is to be taken in connection with the following drawings, in which:

FIG. 3 is a schematic representation illustrating the structure of the Pen Master File maintained within the feedlot management computer system;

FIG. 4 is a schematic representation illustrating the structure of the Ration Master File maintained within the feedlot management computer system;

FIG. 5 is a schematic representation illustrating the structure of the Feed Ration Consumption History File maintained within the feedlot management computer;

FIG. 6A is a schematic representation illustrating the structure of the Feed Delivery Vehicle Driver Master File maintained within the feedlot management computer system;

FIG. 6B is a schematic representation illustrating the structure of the Feed Delivery Vehicle Number Master File maintained within the feedlot management computer system;

FIG. 7 is a schematic representation illustrating the structure of the Telecommunication Channel Master File maintained within the feedlot management computer system;

FIG. 8 is a schematic representation illustrating the structure of the Feed Ration Delivery File generated within the feedbunk reading computer system;

FIG. 9 is a schematic representation illustrating the structure of the Feed Load Assignment File generated within the feedmill computer system;

FIG. 9B is a schematic representation illustrating the structure of the Feed Load/Pen Subsequence Allocation File created within the feedmill computer system and displayed on the LCD panel thereof during the feed load and pen subsequence assignment process;

FIG. 10 is a schematic representation illustrating the structure of the Feed Ration Dispensed File created within each feed delivery vehicle computer system;

FIG. 11 is a schematic representation illustrating the structure of the Cattle Movement/Death File maintained within the feedlot management computer system;

FIG. 12 is a schematic representation illustrating the structure of the Cattle Movement History File maintained within the feedlot management computer systems;

FIG. 13 is a schematic representation of the Feed Ration Charge File created within the feedlot management computer system and transmitted to the financial accounting/billing computer system;

FIG. 20 is a block diagram of an automated system for developing an appropriate treatment for sick animals.

DETAILED DESCRIPTION OF THE ILLUSTRATIVE EMBODIMENT OF THE PRESENT INVENTION

Figure 1:
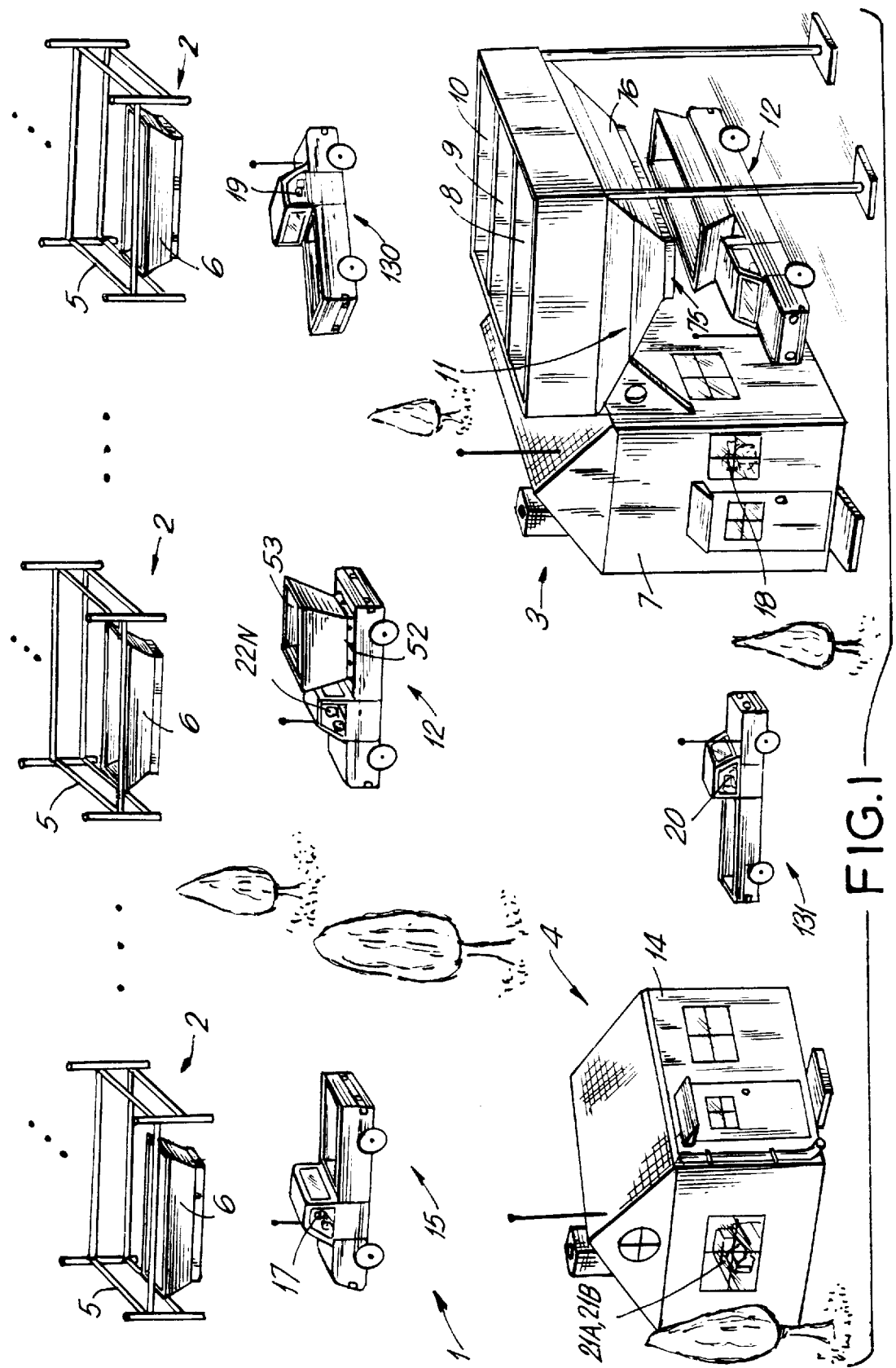
FIG. 1 is a schematic representation of a feedlot within which the computer network of the present invention is installed.

Referring to FIG. 1 of the drawings, there is shown an exemplary feedlot 1 comprising several cattle pens 2, a feedmill 3 and a base office 4. Typically, each cattle pen 2 comprises fencing 5 and an associated feedbunk 5 capable of holding a feed ration, i.e. an amount and type of feed ration. The length of each feedbunk will vary from feedlot to feedlot and typically has a length commensurate with the length of each animal pen.

Feedmill 3 typically comprises an enclosed building structure 7 for housing office furniture and a feedmill computer system 18 programmed for (i) assigning feed loads and pen sequences, and (ii) controlling various feedmill operations, the nature of which will be described in greater detail hereinafter. In addition, elevated storage bins 8, 9 and 10, and feed ingredient mixing/metering equipment 11 operably associated with a feedmill computer system 18, are provided so that a specified feed load (i.e. comprising one or more feed batches) can be milled and mixed (i.e. prepared) and then loaded onto a feed delivery vehicle 12.

Base office 4 typically comprises an enclosed building structure 14 for housing office furniture, a feedlot management computer system 21A, and a feedlot financial accounting/billing computer system 21B, the nature of which will be described in greater detail hereinafter. Within this building, the manager of the feedlot (hereinafter "the feedlot manager") typically maintains an office along with personal involved in financial accounting and billing operations.

Figure 2:
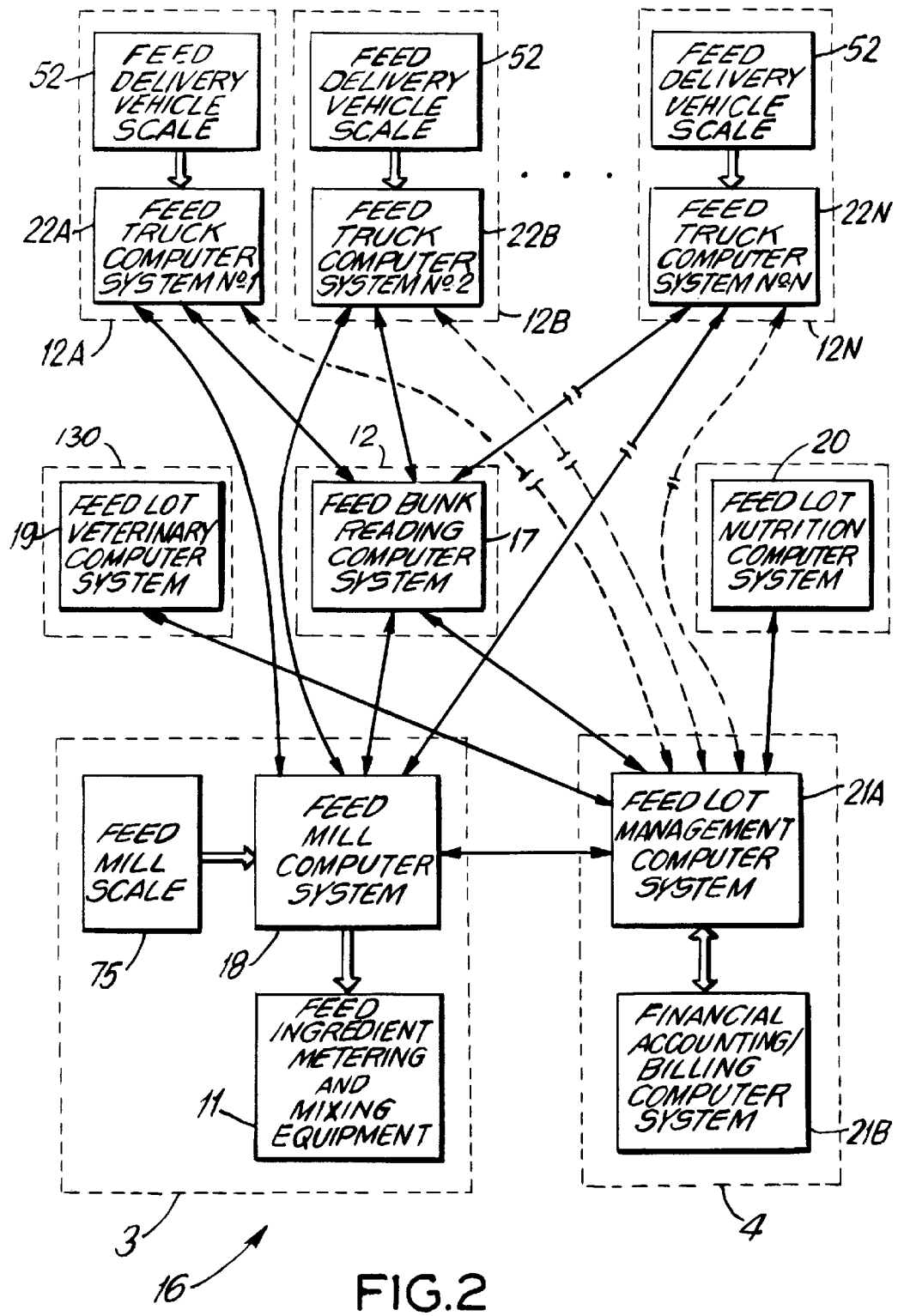
FIG. 2 is a block system diagram of the computer network of the first illustrative embodiment of the present invention, showing its major components, namely the portable feedbunk reading computer system, the feedlot management computer system, the feedmill computer system, the portable feedlot veterinary computer system, the portable feedlot nutrition computer system, the feedlot financial accounting/billing computer system, and the set of portable feed delivery vehicles computer systems.

In FIG. 2, the feedlot computer network of the first illustrative embodiment of the invention is shown. In general, computer-network 15 comprises feedbunk reading computer system 17, feedmill computer system 18, feedlot veterinary computer system 19, feedlot nutrition computer system 20, feedlot management computer system 21A, financial accounting computer system 21B and feed delivery vehicle computer systems 22A, 22B and 22N. In the first illustrative embodiment of the present invention illustrated in FIG. 2, a preferred configuration of the feedlot computer network is illustrated. It is understood, however, that alternative configurations for the computer network may be adopted without departing from the scope and spirit of the present invention.

As illustrated in FIG. 1, the "feedbunk reader" collects data relevant to feedbunk management operations by driving a vehicle, such as a pick-up truck 15, to the pens where head of cattle are confined for feeding and/or veterinary care. In most larger feedlot operations, the feedbunk reader, or like person carrying out his responsibilities, has one primary function: to assign specific types and amounts of feed (hereinafter "feed rations") to be delivered to each pen and dispensed within the feedbunk associated therewith during the designated feeding cycles executed within a given day. As is well known in the art, the type and total amount of feed ration assigned per head of cattle will depend on a number of factors, including the particular stage of growth of the cattle. Typically, the number of feeding cycles scheduled by the feedlot manager in a given day will range from one to four or more. However, for purposes of illustration only, the illustrative embodiment considers the case of a daily feeding program having three feeding cycles carried out at three different times during the day.

The primary functions of the feedlot manager, on the other hand, are to maintain daily records on the following items: (i) cattle held in each pen; (ii) the ingredients/formulation of the feed rations; (iii) the feed ration consumption history of the cattle over a period of time; (iv) the identity of each driver of a feed delivery vehicle; (v) the identification and description of feed ration delivery vehicles within the pens in the feedlot; and (vii) the charges to be billed to cattle owners for the feed rations delivered to their cattle. It is understood, however, that these functions may be allocated differently from one feedlot to the next.

In order that the feedbunk reader can perform his responsibilities on a daily basis, feedbunk reading computer system 17 is carried aboard his vehicle 15. As will be described in greater detail, the feedbunk reading computer system is programmed with various data processing routines and is interfaced with other computer systems within the feedlot computer network. In this way, the feedbunk reader can create, process, maintain, transmit and receive various types of data files among the other computer systems and thereby carry out his feed ration assignment functions in accordance with the principles of the present invention.

Figure 2A:
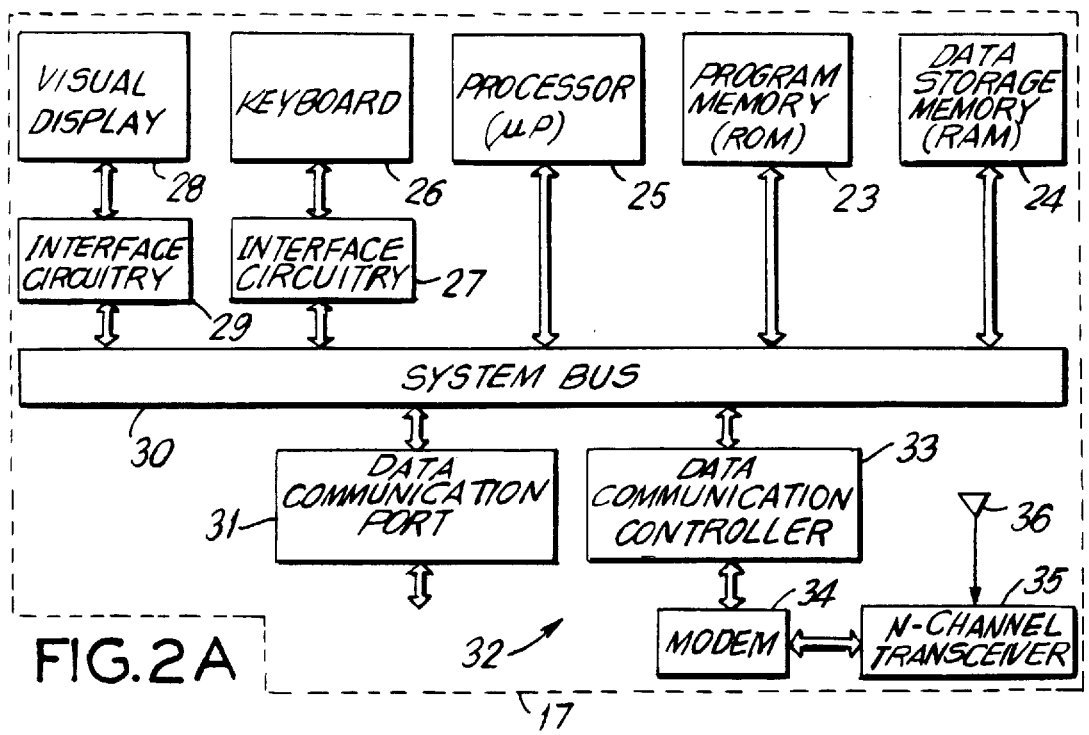
FIG. 2A is a block schematic diagram illustrating the subcomponents of the feedbunk reading computer system of the computer network of the present invention.

As illustrated in FIG. 2A, feedbunk reading computer system 17 of the preferred embodiment comprises a number of subcomponents, namely: program memory (e.g. ROM) 23 for storing computer programs; data (file) storage memory 24 (e.g. RAM) for storing various data files; a central processing unit (e.g. microprocessor) 25 for processing data elements contained in these data files; a data entry device, such as a keyboard or key pad 26 and associated interface circuitry 27; and visual display device 28, such as a liquid crystal display (LCD) panel, and associated driver circuitry 29. As shown, all of the system subcomponents are interfaced with a system bus 30, in a manner known in the art. In order that data files can be transmitted from and received by the computer system, a pair of data communication ports 31 and 32 are operably associated with microprocessor 25 by way of system bus 30. Each of these data communications ports are adapted to support a suitable (e.g. RS-232) data communication protocol. Data communication port 31 includes a multi-pin jack for physically interfacing the feedbunk reading computer system with other computer systems in the network using a suitable coaxial or like transmission cable. Telecommunication port 32 comprises a data communication controller 33, modem 34, an N-channel RF transceiver 35 and an antenna 36, serially configured as shown in a manner known in the telecommunication arts. Preferably, each of these channels is preassigned to a particular computer system within feedlot computer network over which data files can be received. Thus using this data communication port 32, the feedlot manager can transmit data files to a selected computer system using its preassigned channel. Preferably, the feedbunk reading computer system described above is realized by a portable (e.g. laptop on palm-top) computer system commercially available from one of many possible vendors. In this way, the system can be easily moved into and out of the feedbunk readers vehicle 15, as desired or required. As will be described in greater detail hereinafter, the portable feedbunk reading computer system runs a computer program having a number of different routines in order to carry out various data processing and transfer operations within the computer-network.

Figure 2B:
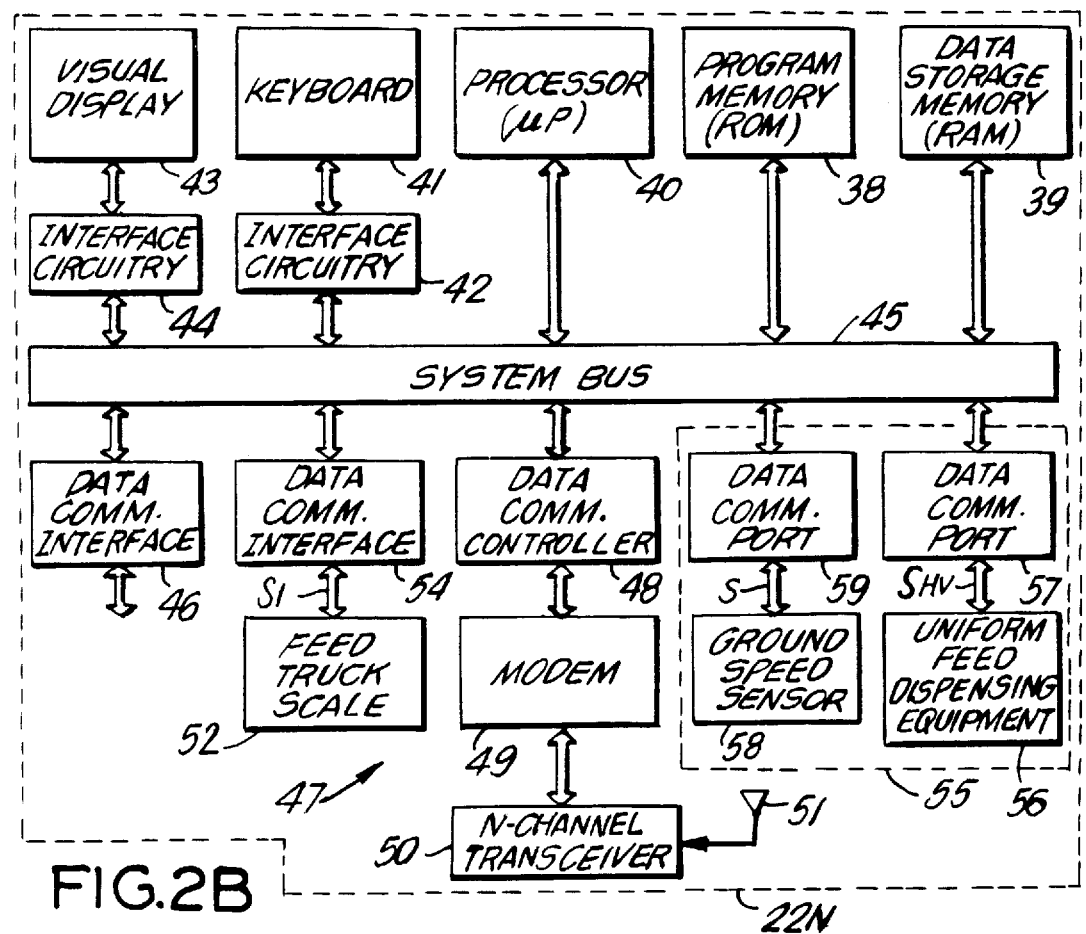
FIG. 2B is a block schematic diagram illustrating the subcomponents of each feed delivery vehicle computer system of the computer network of the present invention.

As illustrated in FIG. 2B, each feed delivery vehicle computer system 22N of the preferred embodiment, comprises a number of integrated subcomponents, namely: program memory 38 (e.g. ROM) for storing of computer programs; data (file) storage memory 39 (e.g. RAM) for storing various data files; a central processing unit (e.g. microprocessor) 40 for processing data elements contained in these data files; a data entry device such as a keyboard or keypad 41 and associated interface circuitry 42; and a visual display device, such as a LCD panel 43 and associated driver circuitry 44. As shown, all of these system subcomponents are interfaced with a system bus 45. In order that data can be transmitted from and received by each delivery vehicle computer system within the network, a pair of data communication ports 46 and 47 are operably associated with microprocessor by way of system bus 45. Each of these data communication ports are adapted to support a suitable (e.g. RS-232) data communication protocol. Data communication port 46 includes a multi-pin connection which permits the feed delivery vehicle computer to be physically interfaced with the other computer systems in the network in a manner described above. In the illustrative embodiment, telecommunication port 47 comprises a data communication controller 48, modem 49, and N-channel transreceiver 50, and an antenna 51, serially configured as shown in a manner known in the telecommunication arts. In this way, each feed delivery vehicle computer system can transmit or receive data files over the N different RF channels available within the feedlot computer network.

In order that each feed delivery vehicle is capable of measuring the actual amount of feed loaded onto an assigned feed delivery vehicle at the feedmill and subsequently dispensed into the feedbunks associated with an assigned pen subsequence, a scale 52 is operably associated with feed load storage compartment 53 aboard each feed delivery vehicle 12 in a manner known in the art. The function of the scale is to provide an electrical signal $S_1$ indicative of the total weight of the feed contained within feed load storage compartment 53. Signal $S_1$ is digitized and provided as input to the feed delivery vehicle computer system by way of a suitable data communication interface 54 associated with system bus 45. By measuring the weight of the feed within storage compartment 53 and recording these measurements in the associated feed delivery vehicle computer system, it is possible to compute the actual amount of feed ration either (i) supplied to the feed load storage compartment 53 during the feed loading process at the feedmill, or (ii) dispensed therefrom into the feedbunk of any pen in the feedlot. Such computations can be implemented in a straightforward manner using programming techniques well known in the art.

In order to ensure that feed is delivered to each feedbunk in a substantially uniform manner, (i.e. equal amount of feed dispensed per linear foot travelled by the feed delivery vehicle), a uniform feed dispensing control subsystem 55 is installed aboard each feed delivery vehicle. In general, subsystem 55 has hardware and software components. The hardware component comprises a hydraulically activated feed delivery mechanism 56 which includes hydraulic valve electronically controlled by control signals $S_{HV}$ generated by the feed delivery vehicle computer system and transmitted via data communication port 57. In order that such control signals can be generated on a real-time basis within the feed delivery vehicle computer system, a ground speed radar instrument 58 is mounted aboard vehicle 12, to measure the true ground speed of the vehicle and to generate an electrical signal S2 indicative thereof. This signal is provided to the feed delivery vehicle computer system via data communication port 59. Signals $S_1$ and $S_2$ are sampled at a sufficient rate and are utilized by a Uniform Feed Dispensing Control Routine executed within the feed delivery vehicle computer system to produce control signal $S_{HV}$ which is provided to the hydraulic valve of uniform feed delivery control subsystem 55. In this way, the computer system aboard each feed delivery vehicle controls the incremental dispensation of feed so for each linear foot traversed by the feed delivery vehicle, a substantially constant amount of feed ration is dispensed along the total length of the feedbunk.

Preferably, each feed delivery vehicle computer is realized by a portable (e.g. laptop or palmtop) computer system releasably mounted on the dashboard of the cab of the feed delivery vehicle so that it can easily be utilized by the delivery vehicle driver when dispensing feed to feedbunks. The interconnection between data communication port interface 54 and scale 52 aboard the vehicle can be achieved using a conventional data communication cable. The LCD panel of the computer system should be positionable within the purview of the driver with respect to the driver's seat. Antenna 51 is mounted outside the vehicle and is electrically connected to transceiver 50 using RF transmission cable.

In the illustrative embodiment, feedmill computer system 18 is realized as a single computer system which comprises a number of integrated subcomponents, namely: program storage memory (e.g. ROM) 60 for storing computer programs; data (file) storage memory 61 (e.g. RAM) for storing various data files; a central processing unit (e.g. microprocessor) 62 for processing the data elements contained in these data files; a data entry device such as a keyboard or key pad 63 and associated interface circuitry 64; and visual display device 65 such as a LCD display panel, and associated driver circuitry 66. As shown, all of these system subcomponents are interfaced with a system bus 67 in a manner known in the art. In order that data can be transmitted from and received by the computer system, a pair of data communication ports 68 and 69 are operably connected with microprocessor 62 by way of system bus 67, and are adapted to support a data communication protocol (e.g. RS 232 protocol). Specifically, data communication port 68 includes a multi-pin jack for physically interfacing feedmill computer system 18 with other computer systems within the feedlot computer network, as desired. Telecommunication port 69 comprises a data communication controller 70, modem 71, an N-channel RF transceiver 72, and an antenna 73, serially configured as shown. In this way, using telecommunication port 69, the feedmill operator or other person at the feedmill can transmit or receive data files over the N RF channels within the feedlot computer network.

In order that the feedmill is capable of measuring the actual amount of feed loaded onto any particular feed delivery vehicle, scale 75 is operably associated with feed ration storage bin 76. The function of this scale is to provide an electrical signal indicative of the total weight of prepared feed ration contained within storage bin 76. This signal is digitized and provided as input to the feedmill computer system via data communication port 77 associated with system bus 67. By measuring the weight of the feed within the feed ration storage bin and recording these measurements in the feedmill computer system, the actual amount of feed ration prepared and loaded onto a particular feed delivery vehicle can be computed in a straight forward manner.

Figure 2C:
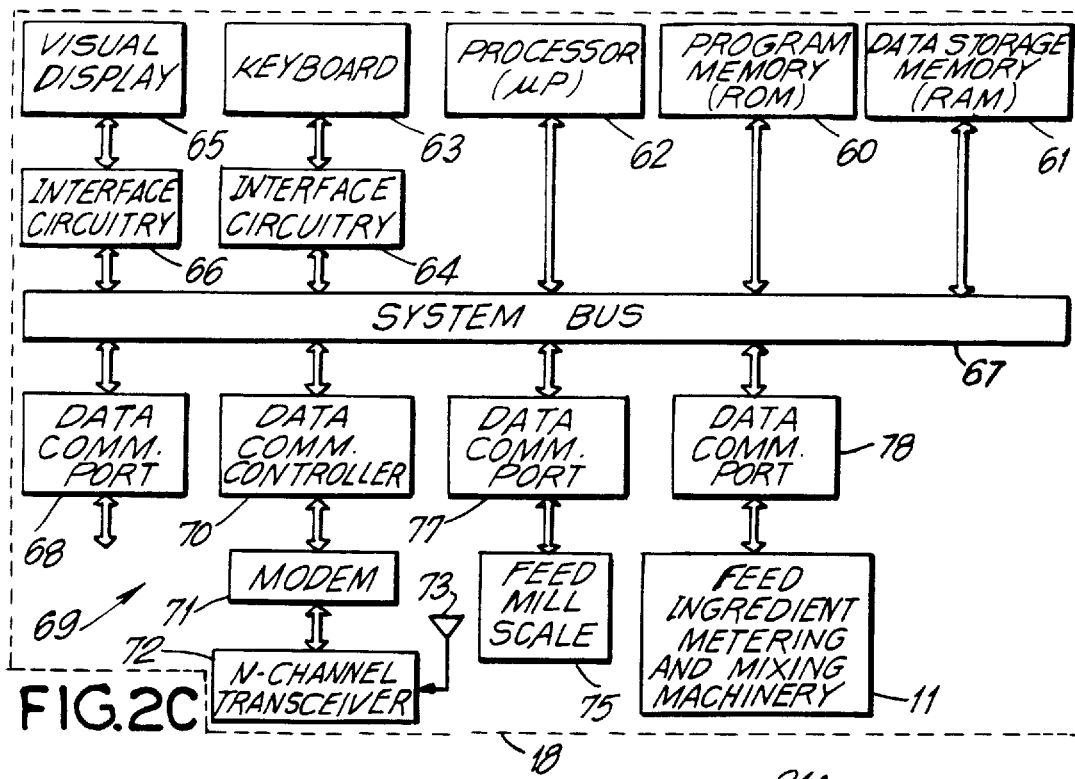
FIG. 2C is a block schematic diagram illustrating subcomponents of the feedmill computer system of the computer network of the present invention.

As illustrated in FIGS. 2 and 2C, the feed ingredient metering and mixing equipment 11 at the feedmill is controlled by control signals generated by a Feedmill Control Program running within feedmill computer system 18 and transmitted to the machinery through data communication port 78. The feedmill computer system described above can be realized by any computer system capable of running software for (i) assigning feed load and pen subsequence assignments, as will be described in detail hereinafter, and (ii) controlling feed ingredient metering and mixing equipment 11 at the feedmill. A suitable computer system capable of performing these functions is the ZBV-2526-EK computer system commercially available from Zenith Data Systems, Inc. Suitable feedmill control software is commercially available from Lextron, Inc. under the tradename FLOWCON.

Figure 2D:
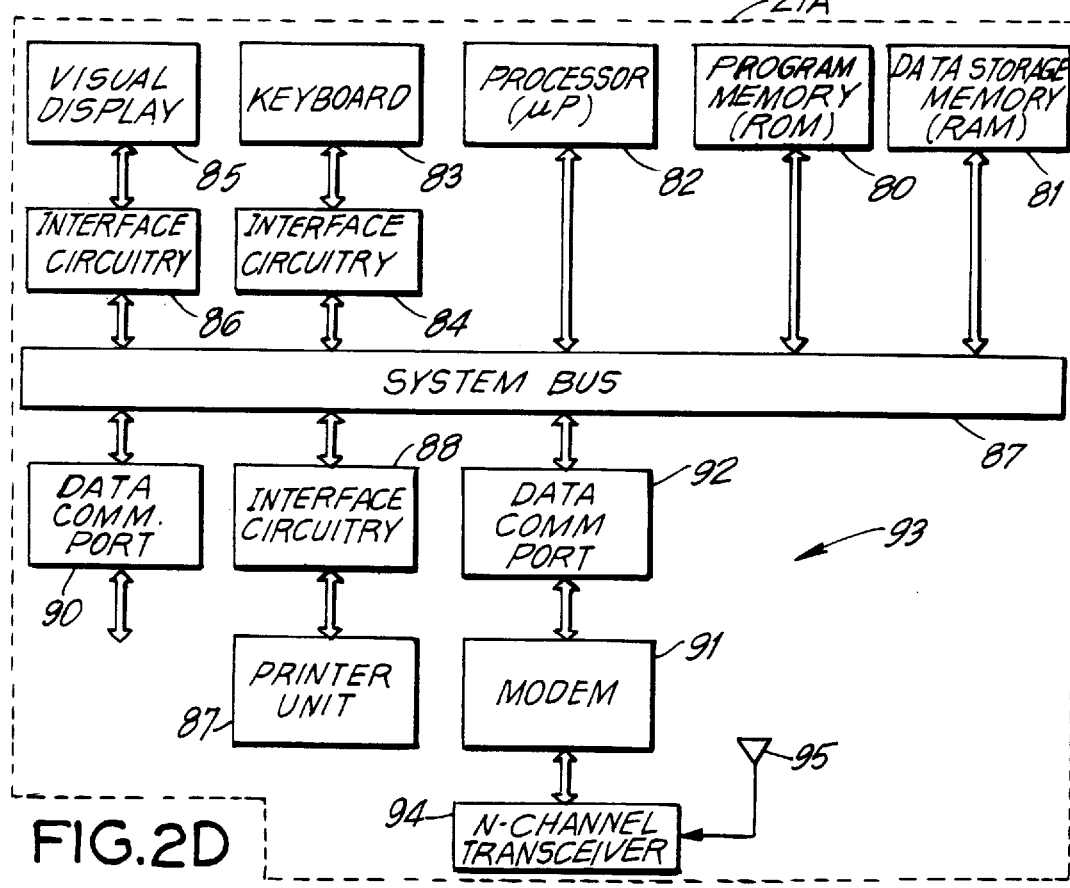
FIG. 2D is a block schematic diagram illustrating the subcomponents of the feedlot management computer system of the computer network of the present invention.

As illustrated in FIG. 2D, feedlot management computer system 21A of the preferred embodiment also comprises a number of integrated components, namely: program storage memory (e.g. ROM) 80 for storing computer programs; data (file) storage ROM 81, (e.g. RAM) for storing various data files; a central processing unit (e.g. microprocessor) 82 for processing data elements contained in these data files; a data entry device such as a keyboard or keypad 83 and associated interface circuitry 84; a visual display device 85 such as a LCD panel, and associated driver circuitry 86; and a hardcopy printer 87 and associated interface circuitry 88. As shown, all of these systems subcomponents are interfaced with a system bus 89 in a manner known in the art. In order that data files can be selectively transmitted from and received by the feedlot management computer system, a pair of data communication ports 90 and 91 are operably associated with microprocessor 82 by way of system bus 89. Specifically, data communication port 90 includes a multi-pin jack for physically interfacing the feedlot management computer system with other computer systems within the feedlot computer network. Telecommunication port 91 comprises a data communication controller 92, a modem 93, an N-channel RF transceiver 94, and an antenna 95, serially configured as shown. In this way, the personnel at the feedlot management computer system can transmit or receive data files over the N RF channels within the feedlot computer network. In the preferred embodiment, feedlot management computer system is realized by a PC-type computer.

As shown in FIG. 2, feedlot management computer system 21A is interfaced with a financial accounting/billing computer system, which is equipped with conventional financial accounting software suitable for feedlot accounting and billing operations. A suitable feedlot financial accounting computer system is the SYSTEM 36 mini-mainframe computer system commercially available from Digital Equipment Corporation. Suitable financial software is commercially available from Turnkey Systems, Inc. under the tradename TURNKEY. In an alternative embodiment, a single computer system can be used to run computer software for both feedlot management and financial accounting/billing operations.

Figure 2E:
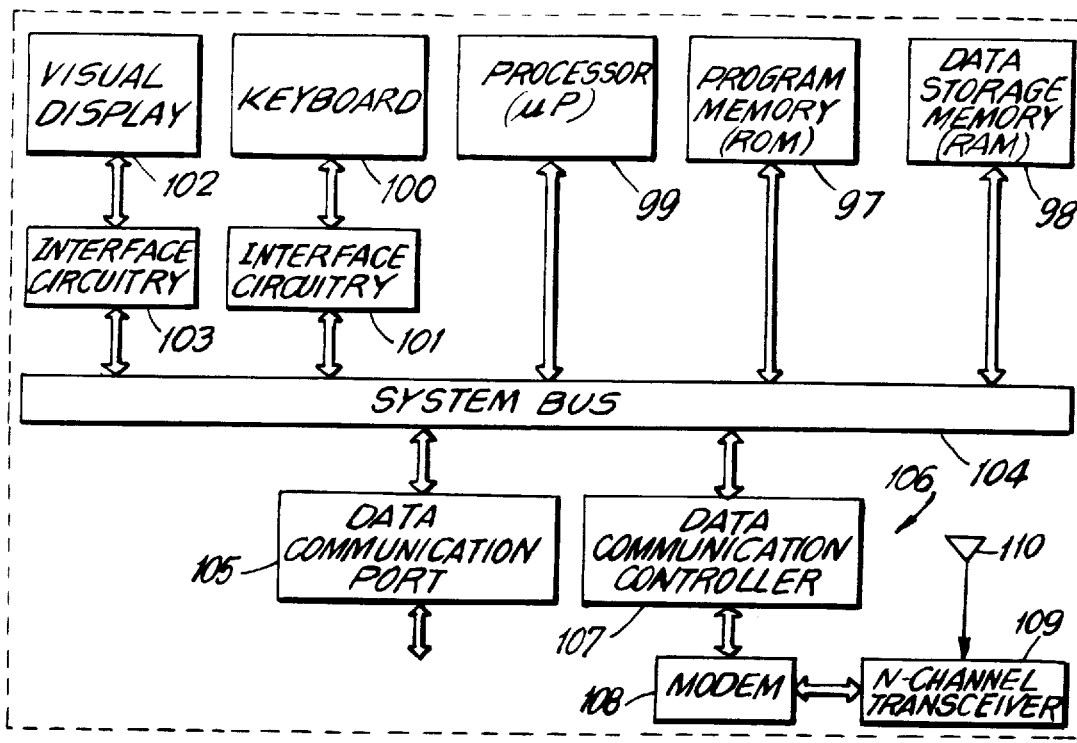
FIG. 2E is a block schematic diagram illustrating the subcomponents of the feedlot veterinary computer system of the computer network of the present invention.

As illustrated in FIG. 2E, feedlot veterinary computer system 19 of the preferred embodiment comprises a number of subcomponents, namely: program memory (e.g. ROM) 97 for storing computer programs; data (file) storage memory 98 (e.g. RAM) for storing various data files; a central processing unit (e.g. microprocessor) 99 for processing the data elements contained in these data files; a data entry device, such as a keyboard or key pad 100 and associated interface circuitry 101; and visual display device 102, such as a LCD panel, and associated driver circuitry 103. As shown, all of these system subcomponents are interfaced with system bus 104 in a manner known in the art. In order that data files can be transmitted from and received by computer system 19, a pair of data communication ports 105 and 106 are operably associated with microprocessor 99 by way of system bus 104. Data communication port 105 includes a multi-pin jack operably associated for physically interfacing the feedlot veterinary computer system with other computer systems within the network. Telecommunication port 106 comprises a data communication controller 107, modem 108, an N-channel RF transceiver 109 and an antenna 110, serially configured as shown. In this way, the feedlot veterinary computer system can transmit or receive data files over the N RF channels within the feedlot. Preferably, the feedlot veterinary computer system described above is realized by a portable (e.g. laptop on palm-top) computer system commercially available from one of many possible vendors. In this way, the system can be easily moved into and out of the feedlot managers veterinarian's vehicle 130, as desired or required. In the illustrative embodiment, veterinary computer system 19 runs a computer program having a number of different routines which carry out various data processing and transfer operations relating to veterinary health care of the cattle in the feedlot.

Sick animals are brought to an evaluation/treatment prescribing station at an animal feed lot—either newly culled as sick from the normal population or delivered from a hospital pen for an already confined subject. Turning to FIG. 20, the treatment regimen to be administered is developed via the interactive communication between the diagnostician/hand and a digital processor (e.g., a microprocessor) 1100 employing an output display 1110 and a data entering keyboard 1112.

Included among the processing variables discussed below, the animal's identity (e.g., as marked on an ear tag), weight and temperature are entered in a random access memory (RAM) portion 1104 of a composite memory 1102. The weight, temp-erature and tag number may be manually entered at the keyboard 1112 by the diagnostician who reads the scale weight, the thermometer and observes the ear tag number. Alternatively, per se well known weight and temperature sensors 180 and 186 with analog electrical outputs may be utilized. Analog-to-digital converters 182 and 191 respectively convert the output of sensors 180 and 186 to digital form. The ear tags may be electrically coded and automatically read by any per se known tagging and scanner system 193. A multiplexer 195 delivers the animal's weight, temperature and identity in digital form to RAM memory 1104 for entry. In addition to the RAM memory 1104 containing specific animal data records, composite memory 1102 includes a memory portion 1107 which stores a regimen change table, and a portion 1109 containing appropriate treatment regimens for various diseases, disease histories and animal circumstances. Memory portions 1107 and 1109 may be RAM and ROM (read only memory); and the storage segments 1104, 1107 and 1109 may form part of one common memory device. Also included in the FIG. 20 system memory 1102 (on a discrete or integrated basis) is a store 1105 which holds the program instruction set for the composite FIG. 20 stored program controlled system and for microprocessor 1100 in particular.

Figure 21A:
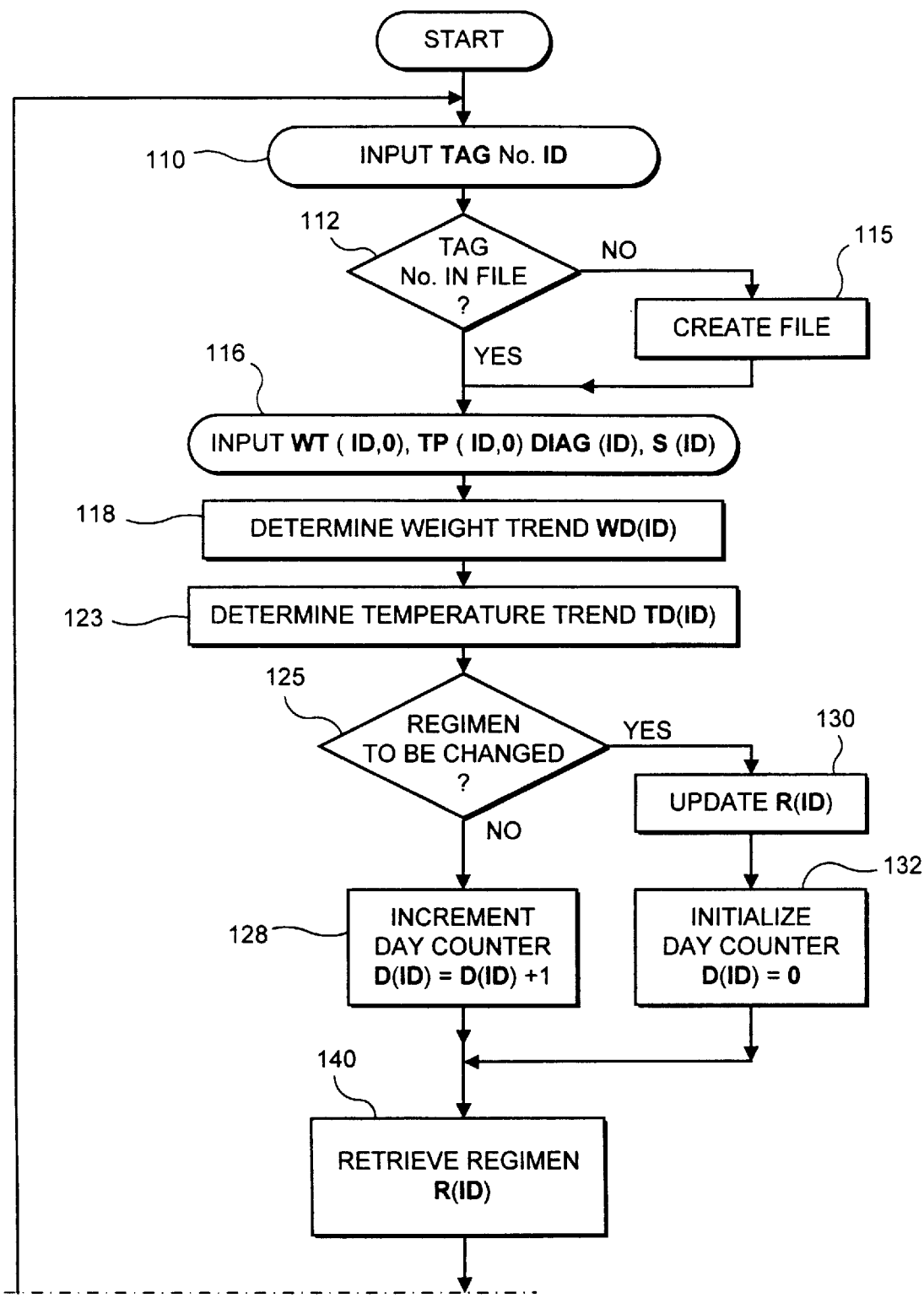
FIGS. 21A and 21B are flow charts depicting the processing for the system shown in FIG. 20.
Figure 21B:
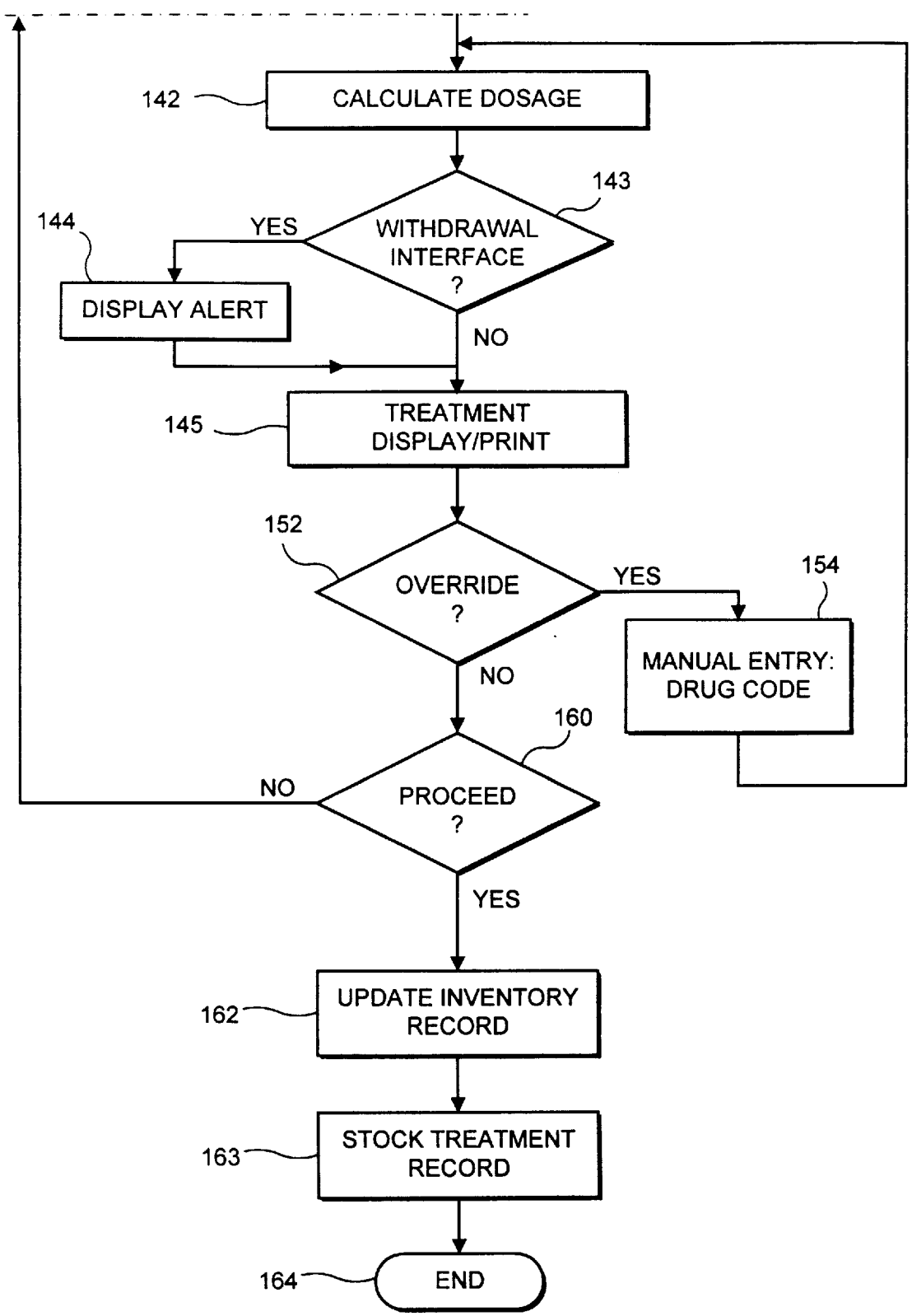

Referring now to FIGS. 21A and 21B, hereinafter referred to as composite FIG. 21, there is shown a flow chart for operation of the instant stored program controlled livestock treatment system. The system may be implemented with any micro or larger processor, in any of the widely used interpretive, compiler, assembly or machine languages. The variable designations and instruction syntax used below are for illustrative purposes only and have readily correspondents in any useful language.

For processing purposes the following variables are employed:

| VARIABLE TABLE | |
|---|---|
| Variable Name | Quantity Identified |
| ID | Tag number for the animal being processed. |
| WT(ID,D) | A doubly indexed variable representing the weight of the animal with identification ID animal D-days ago (current weight residing in D(ID,O)). |
| WD(ID) | The weight trend for the animal ID showing whether he is currently losing or gaining weight and at what rate. |
| TP(ID,D) | A doubly indexed variable representing the temperature of the animal ID D-days ago (current temperature residing in TP(ID,O)). |
| TD(ID) | The current temperature trend of animal ID. |
| R(ID) | The current regimen administered to the animal ID. |
| D(ID) | The number of days the animal ID has been on a regimen R(ID). |
| DIAG(ID) | The diagnosis of the animal ID. |
| S(ID) | The severity of the diagnosed disease DIAG(ID). |

-continued

| VARIABLE TABLE | |
|---|---|
| Variable Name | Quantity Identified |
| DG(K) | The ensemble of k drugs to be administered for the operative regimen R(ID). |
| DS(K) | The dose per 100 pounds of drug DG(K). |
| DS(K,ID) | The dosage or the like indexed drug DG(K) to be given animal ID. |
| WTH(K) | The withdrawal time to purge the k drug from an animal's system. |
| TMKT(ID) | The scheduled time to market for the animal ID. |

To begin processing (FIG. 21A), for the next encountered animal, its tag number identification (ID) is read or keyed in (step 110) and compared with the identification variable, ID for all stored animal records in RAM 1104. If a file already exists ("YES" branch from test 112), processing proceeds to step 116. If no record is found for the animal one is established with all data fields cleared (step 115). The currently measured weight (WT(ID,0)); measured temperature (TP(ID,0)); diagnosed disease (DIAG(ID)) and observed disease severity (S(ID)) are then entered (step 116)—all indexed for the subject animal ID.

The system next calculates several factors meaningful to determine a suitable treatment for the animal. In functional block 118, the current weight measurement (WT(ID,0)) is combined with one or more past readings (WT(ID,1)) . . . (WT(ID,N)) to determine the direction (polarity) and amplitude of the animal's weight trend (WD(ID)). The weight trend (WD(ID)) may most simply be done on a day-to-day basis, employing $$WD(ID)=WT(ID,0)-WT(ID,1);  \quad \text{Equation 1.}$$

or by employing any well known regression algorithm over a longer period but which emphasizes current data. Functional block 123 similarly determines the animal's temperature trend TD(ID).

Test 125 next examines the animal's weight and temperature trends WD(ID) and TD(ID), its day-on-regimen count D(ID) and its specific regimen R(ID) to determine if the current treatment program should be changed. A change would be in order ("YES" test 125 branch) for example for a large weight loss trend (above threshold negative WD(ID)) or high temperature increase (large positive TD(ID)) indicating an animal in serious trouble needing an immediate, more stringent remedy. A change is also indicated for a high day-on-regimen (D(ID)) value absent favor-able trending (WD(ID)) and/or (TD(ID)) values, indicating that the current regimen R(ID) is of no further help. Conversely, favorable weight/temperature trends with lower day-on-regimen counts indicate that the current regimen is effective and therefore need not be changed ("NO" branch of test 125). The test 125 (and regimen updating) changing step 130 may be affected, for example, by storing regimen codes in the regimen change memory 1107 which is addressed (accessed) by rounded integer values of weight change divided (normalized) by weight increments, e.g., INT−(WD(ID)/15) for 115 pound increments; similarly rounded integer values for the temperature trend, and the day-on-regimen variable D(ID). Severity S(ID) may also be used in place of or to supplement the truncated, normalized weight and temperature trend variables to signify animal condition improvement or the lack of it.

Alternatively, the regimen changing test 112 and implement-ation 130 may be effected under software control, by such as $$100 IF -(WD(ID)/15)>1 OR(TD(ID)>1 GOTO200 \quad \text{Equation 2.}$$

$$105 IF\ D>3 GOTO200 \quad \text{Equation 3.}$$

$$200 R(ID)=R(ID)+1 \quad \text{Equation 4.}$$

Test instruction 100 increases the regimen level responsive to an above-acceptable weight decrease $-(WD(ID)/15)>1$ (i.e., more than 15 pounds during the one day period, or sharp (as 1° F.) temperature increases $TD(ID)>1$ by program transfer to instruction 200. Similarly, an instruction like equation 4 unconditionally increases the regimen level after three days although the test criteria can include coincidence logic such as $D>3 AND-WT(ID)>5$.

When a new regimen is appropriate ("YES" test 125 branch), the new regimen identification is extracted from memory or computed as above described and loaded into R(ID) (step 130). The day-on-regimen counter D(ID) is cleared to "0" (step 132). If no change in regimen is signalled by the regimen change storage table or date processing, the existent regimen is continued for one further day and thus the day counter variable D(ID) is updated (step 128) as by $$D(ID)=D(ID)+1 \quad \text{Equation 5.}$$

Step 40 next retrieves the regimen, i.e., the array and amount of drugs to be administered—per 100 animal pounds where the dose varies. This is effected by accessing the regimen tables stored in the memory 1109 using as memory accessing (selection) variables the diagnosed condition DIAG(ID), severity S(ID) regimen R(ID) and days-on-regimen D(ID). Integer, normalized values for weight and/or temperature trends may also be employed as memory access/address variables for a more precisely varied regimen selection. For example, an animal suffering a respiratory ailment of medium severity may be given the following intermediate regimen; R(ID):

Day 0(D(ID)=0):
  a. 5 cc Aqueous Pen G./100 lbs. (IM)
  b. 2 cc IBR (MLV)
  c. 4 cc Vitamin C/100 lbs. (SQ)
Day 1:
  a. 5 cc Aqueous Pen G./100 lbs. IM
Day 2:
  a. 5 cc Aqueous Pen G./100 lbs. IM
  b. If acceptable response, administer 1 Albon SR bolus/ 200 lbs.

Withdrawal for this regimen is 30 days. Alternatively, if after the intermediate regimen no noticeable improvement is logged, the logic will retrieve a higher order regimen:

Day 0 (D(ID)=0):
  a. 4 cc Gallimycin/100 lbs. (IM)
  b. 2 cc IBR (MLV)
  C. 4 cc Vitamin C/100 lbs. (SQ)
Day 1:
  a. 4 cc Gallimycin/100 lbs. IM
Day 2:
  a. 4 cc Gallimycin/100 lbs. IM
  b. If acceptable response, administer 1 Albon SR bolus/ 200 lbs.

Withdrawal for this regimen is 30 days.

The dose DS(K,ID) for each of the medication(s) DG(K) to be administered to animal ID is then determined by multiplying the dose per unit weight (e.g., 100 pounds) DS(K) by the animal's weight WT(ID) and rounding to the nearest measure (e.g. to the nearest 5 cc or half bolis), as by $$DS(K,ID)=INT(DS(K)*WT(ID)). \quad \text{Equation 6}$$

Test 143 determines if the withdrawal period for any drug WTH(K) equals or exceeds the scheduled time to market TMKT(ID) for the animal. If so, i.e. if WH(K)>, TMKT(ID), an alert is presented at display 1110 (step 144). In either event, the regimen with doses proper for the subject animal is displayed (step 145) and also printed (at printer 1115 of FIG. 20) if desired.

The user will usually accept the displayed treatment regimen ("NO" branch of test 152). However, the attendant may intervene by entering an override code at test 152 ("YES" branch mandated) and enter the drug code(s) of drugs to be administered (step 154). This may occur, for example, if a displayed alert (steps 144, 145) is to be honored, thus avoiding a delay in marketing the animal (the time WTH(K)>TMKT(ID)) by avoiding nonessential antibiotics or the like for an animal which is seemingly recovering. Program flow returns to step 142 for dose amount computing when an override is in force, and to confirm that withdrawal period alerts are not necessary steps 143 and 144). The override treatment is then displayed (145).

At this point, the user may opt to not institute the treatment ("NO" branch of test 160 returning program flow to the start position to examine the next animal). More typically, however, the diagnostician will elect to proceed ("YES" branching from test 160). When this occurs, step 162 decrements the inventory records for each drug administered to the animal, as by subtracting the administered amount DS(K,ID) from the inven-tory amount INV(K) as by $$INV(K)=INV(K)-DS(K,ID). \quad \text{Equation 7.}$$

Figure 2F:
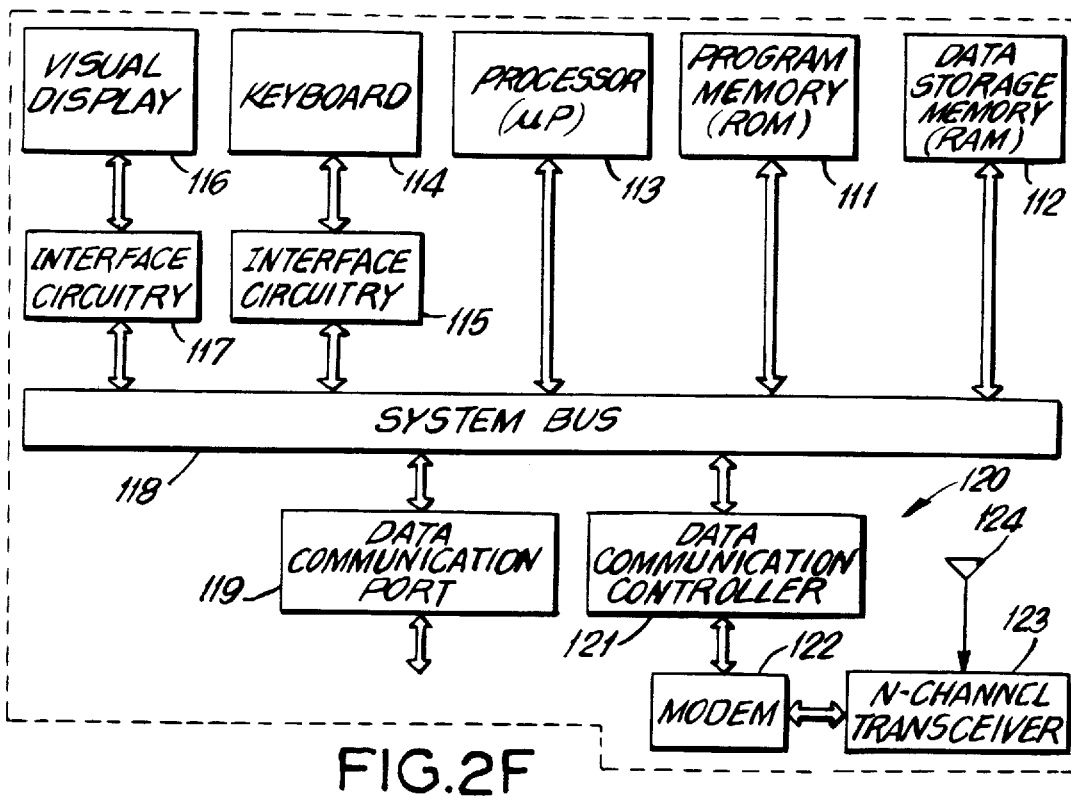
FIG. 2F is a block schematic representation of the subcomponents of the feedlot nutrition computer system of the computer network of the present invention.

Finally, a record of the treatment administered to the animal is put in his treatment record in RAM storage 1104, or more permanent storage means and processing for the animal ID terminates (END step 164). The microprocessor 1100 may be diverted to other tasks for the animal hospital application or, alternatively, may return to the start node to input the tag number of the next animal to be processed As illustrated in FIG. 2F, feedlot nutrition computer system 20 of the preferred embodiment comprises a number of subcomponents, namely: program memory (e.g. ROM) 111 for storing computer programs; data (file) storage memory 112 (e.g. RAM) for storing various data files; a central processing unit (e.g. microprocessor) 113 for processing the data elements contained in these data files; a data entry device, such as a keyboard or key pad 114 and associated interface circuitry 115; and visual display device such as a LCD panel 116, and associated driver circuitry 117. As shown, all of these system subcomponents are interfaced with system bus 118. In order that data files can be transmitted from and received by the computer system, a pair of data communication ports 19 and 20 are operably associated with microprocessor 113 by way of system bus 118. Data communication port 119 includes a multi-pin jack for physically interfacing the feedlot nutrition computer system with other computer systems within the computer network. Telecommunications port 120 comprises a data communication controller 121, modem 122, an N-channel RF transceiver 123 and an antenna 124, serially configured as shown. In this way, the feedlot nutritionist can transmit or receive data files over the N RF channels within the feedlot computer network. Preferably, feedlot nutrition computer system 20 described above is realized by a portable (e.g. laptop on palmtop) computer system commercially available from one of many possible vendors. In this way, the system can be easily moved into and out of the feedlot nutritionist's vehicle 131, as desired or required. In the illustrative embodiment, the portable feedlot nutrition computer runs a computer program having a number of different routines which carry out various data processing and transfer operations relating to the diet and nutrition of the cattle in the feedlot.

With the above-described computer network installed in an animal feedlot, each computer system therein is capable of transmitting or receiving various types of data files during the progression of the feed ration assignment and delivery process of the present invention. As will be described below, the feedlot management computer system initiates this process on a daily basis, and at particular stages of the process engages the feedbunk reading, feedmill and feed delivery vehicle computer systems to commence particular subprocesses, which typically are "user-interactive" in nature. At particular stages of the feed ration assignment and delivery process, each of these computer systems will typically wait to receive particular data files before advancing the feed ration assignment and delivery process. As such, a particular degree of coordination among the individual computer systems in the network is required, as will become apparent hereinafter.

Prior to describing the feed ration assignment and delivery process of the present invention, it is appropriate at this juncture to first describe the structure and function of each data file utilized within the feedlot computer network of the present invention.

As schematically illustrated in FIG. 3, the Pen Master File comprises an organization of data fields associated with each pen in the feedlot. This data file is created within the feedlot management computer system and originally is transferred to the feedbunk reading computer system, the feedlot veterinary computer system, the feedlot nutrition computer system and the financial accounting/billing computer system at the beginning of each new day. During the course of each day, the Pen Master File is maintained (i.e. updated) using data contained in a number of other files which will be described hereinafter. Preferably, this updating process is performed on an on-line basis. The primary function of the Pen Master File is to store all of the current information for each pen of cattle in the feedlot. While other data fields will typically be present for each pen in this file, the Pen Master File of the illustrative embodiment contains only those data fields (and thus the data elements contained therein) which are important to the understanding of the various aspects of the present invention.

As illustrated in FIG. 3, each pen within the feedlot is assigned a unique pen identification number (e.g. a numerical code) which is stored in a pen number field along column 2 of the Pen Master File shown. Within the feedlot, each pen is assigned a pen sequence number which typically is assigned on the basis of the physical location of each pen in the feedlot. These pen sequence numbers are stored in the pen sequence number field along column 1 of the Pen Master File and indicates the general order that the pens are "read" and fed.

The total number of cattle deaths that occur each day in each pen are recorded in the cattle death count fields arranged in column 3 of the Pen Master File. The physical length of the feedbunk associated with each pen is stored in the pen length field along column 4 of the Pen Master File. In many of the larger feedlots, the feedlot is divided into a number of feedlot zones to simplify managerial functions. In such feedlots, each pen will be assigned a feedlot zone number which is stored in the feedlot zone field in column 5. In order to identify the owner of a group or groups of cattle contained in each pen, one or more lot numbers are assigned to each animal pen. The lot numbers of the heads of cattle in a particular pen are stored in the lot number field in column 6 of the Pen Master File. The actual number of living animals in a particular pen is indicated by the head count (i.e. number) stored in the head count field in column 7. The sex of the animals in each pen is indicated by a sex designation (e.g. alphanumeric code M or F) stored in the sex field in column 8 of the Pen Master File.

The date that the group(s) of cattle were brought into the feedlot is recorded in the In-date field in column 9 of the Pen Master File. This date is typically used to calculate the number of days that the animals will be fed a particular type of feed ration. The average weight of the cattle (in a particular pen) when they are brought into the feedlot is recorded in the In-weight field in column 10. Typically, the average in-weight is used by feedlot management computer system to compute the current projected weight using a cattle weight growth simulation model well known in the art. The current ration type being fed to the animals in each pen is indicated by the ration code assigned to the cattle and recorded in the current ration type field in column 11. The number of days that the animals have been assigned the above ration is indicated by the number recorded in the days on ration field in column 12. In instances where a supplemental ration is fed to the cattle in particular pens, a supplemental ration code, indicating the assigned supplemental ration, will be recorded in the supplemental ration field in column 13. The number of days that the animals have been fed the supplemental ration is indicated by the number recorded in the days on supplemental ration field in column 14 of the Pen Master File.

When the feedbunk reader visually inspects (i.e. "reads") the feedbunk of each pen in accordance with the pen sequence numbers in column 1 of the Pen Master file, he will be able to determine (i) how much of the delivered feed ration has been eaten from the feedbunk, (ii) the condition (e.g. health and weight of the animals herein) and, (iii) the condition of the pen itself (i.e. clean or requiring cleaning). During this feedbunk reading process, the feedlot manager assigns each pen a particular feeding priority index or code, which determines where each pen will reside within a prioritized feeding route produced from data contained in the Master Pen File after the feedbunk reader has completed the reading of all feedbunks in the feedlot. Typically, the feeding priority code will have a range from 0 to 4, 0 indicating the greatest feeding priority and 4 the lowest feeding priority. Using this coding scheme, each pen may be moved out of the standard pen sequence order according to the feeding priority code which has been assigned to it during the feedbunk reading process. The feeding priority code for each pen during the first feeding cycle is recorded in the feeding priority field in column 16A of the Master Pen File.

The animals within each pen of the feedlot will be assigned a particular type of feed and total ration amount to be consumed on a particular day of the feeding program. The type and amount of feed ration assigned to each pen on a given day will be computed using (i) cattle weight growth simulation model, (typically selected on the advice of the feedlot nutritionist) and (ii) the feed ration consumption history of the animals in the feedlot. This animal weight growth simulation model is preferably incorporated into a Feed Ration Assignment Computation Routine which is executed within the feedbunk reading computer system in order to compute total feed ration assignments at the beginning of each new day. The total amount of feed ration assigned to each pen is automatically recorded in total daily ration assignment field in column 15 of the Pen Master file. However, depending upon the data collected during the feedbunk reading process, the feedbunk reader may decide to adjust this originally assigned total feed ration amount for each particular pen. Depending on the feedbunk reader and his style of feedbunk management, this adjusted or unadjusted total amount of feed ration may be delivered to the animals in the pen over one, two, three, four or more physically distinct feeding cycles. In the feedlot of the illustrative embodiment, three physical feeding cycles are utilized to deliver the total amount of feed ration assigned to the animals of each pen.

The type of ration delivered may be the same or different during each feeding cycle, and this is indicated by recording the ration code in columns 17A, 17B and 17C, respectively, for the first, second and third feeding cycles. The feeding priority codes for the first, second and third feeding cycles are recorded in columns 16A, 16B and 16C, respectively. The partial amount of feed ration assigned for delivery during each of the three feeding cycles depends on the split percentages utilized by the feedbunk reader for each of the feeding cycles (e.g. 0.33, 0.33 and 0.33). As shown, the partial feed ration assignment are recorded in columns 18A, 18B and 18C, respectively, in the Pen Master File. The amounts of feed ration actually dispensed into the feedbunks during the first, second and third feeding cycles are recorded in the feed ration dispensed fields arranged in columns 19A, 19B and 19C, respectively. As will be described in greater detail hereinafter, the actual amount of feed ration dispensed into the feedbunk of each animal pen during each feeding cycle is measured by and recorded within the feed delivery vehicle computer system aboard the feed deliver vehicle assigned to deliver feed to the pens. Each feed delivery vehicle computer system stores this data within an associated feed ration dispensed field in its Feed Ration Dispensed File (FIG. 10). At the completion of each feeding cycle, these Feed Ration Dispensed Files are transmitted from each feed delivery vehicle computer system to the feedbunk reading computer system. The feed ration dispensed data from the feed ration dispensed fields of each Feed Ration Dispensed File received at the feedbunk reading computer system, is then copied into corresponding feed ration dispensed fields in the Pen Master File in the feedbunk reading computer system. Preferably, thereafter, the Pen Master File in the feedlot management computer system is updated by data transmitted thereto by the feedbunk reading computer system. As will be described in greater detail hereinafter, the feed ration dispensed data of a particular pen, which has been collected during the first feeding cycle, is preferably used to adjust the partial amount of feed ration assigned to that pen during the second and perhaps third feeding cycles, thus providing a feedback mechanism within the feed ration assignment process.

As schematically illustrated in FIG. 4, the Ration Master File comprises a number of data fields associated with each type of feed that can be assigned to the pens, prepared at the feedmill, and then delivered to the feedbunks. This file is created and maintained in the feedlot management computer system and can be updated as required by the feedlot nutritionist. At the beginning of each new day a copy of the Ration Master File is transmitted to the feedmill computer system and the feedbunk reading computer system for storage and subsequent use. As illustrated, the Ration Master File has a feed ration type field for each animal pen, and contains a feed ration code which identifies each type of available feed ration. These fields are arranged along column 1 of the Ration Master File, as shown. In typical applications, it will be desired to treat a set of feed ration types as belonging to a particular group for purposes of feed ration assignment calculations. In such applications, a ration group identification code, assigned to a particular group of feed ration types, is written into the feed ration group field arranged in column 2 of the Ration Master File. When a supplemental ration is to be supplied with a particular type of feed ration, either a "yes" or a "no" indicator is written into the supplemental ration indicator field arranged in column 3.

As illustrated in FIG. 4, the type of ingredients and relative amounts thereof (per pound) comprising each feed ration are recorded in the ration ingredients field associated with each feed ration, arranged along column 5 of the Ration Master File. The dry matter content percent of each feed ration is recorded in the dry matter content percent field, arranged along column 5. If an alternative feed ration has been assigned for any particular feed ration, the ration type code for this alternative feed ration is recorded in the alternative feed ration field, arranged along column 6. The percentage values which indicate how a total amount of assigned feed ration is to be delivered over the first, second and third feeding cycles of a given day, are recorded in split percentage fields for the first, second, and third feeding cycles, arranged along columns 7, 8 and 9 of the Ration Master File. As will be described in greater detail hereinafter, this split percentage data is used by the feedlot management computer system (during the feed ration computation process) to compute the partial amounts of feed ration to be delivered to each pen during the first, second and third delivery cycles in the feedlot of the illustrative embodiment.

In FIG. 5, the Feed Ration Consumption History File is schematically illustrated as comprising a number of data fields associated with each pen in the feedlot. The fields of this file contain detailed data relating to the feeding history of each pen in the feedlot for a specified period of time (e.g., to 180 days) controllable by the feedbunk reader. As will be described in greater detail hereinafter, the Feed Ration Consumption History File is originally created and maintained in the feedlot management computer system using data copied from the main data fields of the Pen Master File at the beginning of each new day. Thereafter, a copy of this file is transmitted to the feedbunk reading computer system and the feedlot veterinary computer system for storage and subsequent use. From time to time, single cattle and groups of cattle will be typically moved from one pen to another. In order to indicate which pens have been involved in cattle movement operations, during the time history of this file, a cattle movement indicator field is associated with each pen, shown arranged along column 1 of the Feed Ration Consumption History File, as shown. Arranged along columns 2 through 7, are the pen number field, the head count field, the lot number field, the sex field, the in-date field and the in-weight field, each of which have described above. For each past day of feeding (e.g. yesterday (Day No. 1), the data associated with the ration type field, the feed ration assignment field and the feed ration dispensed field can be read from columns 8, 9 and 10, respectively, in the Feed Ration Consumption History File.

In FIG. 6A, a schematic representation of the Feed Delivery Driver Vehicle Master File is shown. The file is created and maintained daily in the feedlot management computer system, while a copy of the file is transmitted to the feedmill computer system at the beginning of each new day. As illustrated, this file comprises two primary types of data fields, namely; feed delivery vehicle driver name fields arranged in column 1 for recording the name, address and telephone number of each authorized driver in the feedlot; and feed delivery vehicle driver number fields arranged in column 2 for recording a identification number assigned to each such driver.

In FIG. 6B, a schematic representation of the Feed Delivery Vehicle Master File is shown. This file is also created and maintained daily in the feedlot management computer system and is transmitted to the feedmill computer system at the beginning of each new day. As illustrated, this file comprises three primary types of data fields, namely; feed delivery vehicle number fields arranged in column 1 for recording identification number assigned to each feed delivery vehicle in the feedlots; feed delivery vehicle description fields arranged in column 2 for recording a description of each such vehicle; and feed delivery vehicle load capacity fields arranged in column 3 for recording the maximum load capacity of each feed delivery vehicle.

In FIG. 7, a schematic representation of the Telecommunication Channel Master File is shown. This file is created and maintained within the feedlot management computer system and is then transmitted to each of computer system in the feedlot computer network. As illustrated, this file comprises two primary types of fields, namely: computer system identification number fields arranged in column 1 and assigned channel frequency fields arranged along column 2. The function of the computer system identification number field is to record the channel number assigned to each computer system in the network, whereas the function of the assigned channel frequency field is to record the number of the channel frequency assigned to each computer system. By displaying this file, each computer system in the network can readily determine the channel frequency over which each computer system can receive data files.

As schematically illustrated in FIG. 8, the Feed Ration Delivery File for the first feeding cycle comprises a number of data fields selected from the updated copy of the Pen Master File in the feedbunk reading computer system. All of the data contained within these fields is present in the corresponding fields contained within the updated Pen Master File. This Feed Ration Delivery File is created in feedbunk reading computer system prior to commencing the first feeding cycle, and contains information regarding the feed ration assignments to be delivered to all the pens within the feedlot during the first feeding cycle. Arranged along columns 1 through 12 of the Feed Ration Delivery File, on a pen basis, the following previously described fields: the zone number field, the pen sequence number field, the pen number field, the head count field, the sex indicator field, the lot number field, the feedbunk length field, feeding priority field, the feed ration assignment field, the feed ration dispensed field and feed ration type field. Notably, data fields in each Feed Ration Delivery File are organized by the feeding priority code which is assigned to each pen by the feedbunk reader during the feedbunk reading process. In this way, the pen numbers and the data contained in their associated fields will appear in a prioritized feeding sequence order. This prioritized feeding sequence specifies a prioritized feeding route through the feedlot, in accordance with which the assigned feed rations are to be delivered. As will be described in greater detail hereinafter, a copy of the prioritized Feed Ration Delivery File of FIG. 6 is transmitted from the feedbunk reader computer system to the feedmill computer system and each of the feed delivery vehicle computer systems within the network. Upon reception of the transmitted Feed Ration Delivery File, it is stored in the feedmill computer system and the feed delivery vehicle computer system for future display and use.

In order to deliver the feed ration assignments posted in the Feed Ration Delivery File, the feedmill computer system creates a Feed Load Assignment File from the received Feed Ration Delivery File.

As schematically illustrated in FIG. 9, Feed Load Assignment File for the first feeding cycle comprising a number of data fields which contain information useful to the feedmill operator, or like personnel, during the assignment (i.e. dispatching) of feed loads and pen subsequences to feed delivery vehicles available in the feedlot. As illustrated in FIG. 9, the Feed Load Assignment File for each specified feeding cycle comprises a number of data fields associated with each pen in the prioritized pen feeding sequence which, in the illustrative embodiment, extends from 1, 2, 3 . . . N. As shown, the zone number fields, the (prioritized) pen sequence number fields, the pen number fields, the head count fields and lot number fields are arranged in columns 1 through 5 of the Feed Load Assignment File, respectively. The feedmill operator enters identification codes (e.g. numbers) into the feed delivery vehicle identification fields and the feed delivery vehicle driver identification fields provided in columns 6 and 7, in order to record the identity of each feed delivery vehicle and driver which the feedmill operator assigns (i.e. dispatches) to deliver the feed ration assignments to the pens along a specified section (i.e. subsequence) of the prioritized feeding route.

During the feed load assignment process at the feedmill, a primary function of the feedmill operation is to assign (i) subsequences of pens to available feed delivery vehicles, as well as (ii) amounts of feed that must be loaded onto these vehicles so that they can deliver the feed ration assignment along these pen subsequences. Thus, for each specified pen subsequence assigned to a particular feed delivery vehicle, a total feed load amount must also be assigned thereto. Ideally, this total feed load assignment should be equal the sum of the feed ration assignments for the individual pens along the specified subsequence. The details of the feed load assignment process will be described below.

There may be instances when the feedmill operator may decide to assign more or less feed to a feed delivery vehicle. When assigning a feed load amount to a particular feed delivery vehicle and associated driver, the feedmill operator calls up the Feed Delivery Vehicle Master File, reads the identification number on the feed delivery vehicle parked at the feedmill, and then determines it maximum load capacity from this file. The feedmill operator then enters (i.e. records) the elicited information into the four fields of the Feed Load/Pen Subsequence Allocation File schematically illustrated in FIG. 9B. As shown in FIG. 9B, these four fields are: (1) the next unassigned pen number field; (2) the available feed delivery vehicle identification number field; (3) the driver identification field; and (4) the maximum feed delivery vehicle load capacity field. Upon completing the entry of the above data into the Feed Load/Pen Subsequence Allocation File, the identification codes for the feed delivery vehicle and driver are automatically recorded into their respective fields along the pen subsequence in the Feed Load Assignment File which begins with the pen number entered into the next unassigned pen number field and terminates with the pen number, at which the accumulated amount of feed ration assignments equals the maximum load capacity of the feed delivery vehicle. This accumulated total amount of feed will be automatically recorded in the total feed load assigned field arranged in column 10 of the Feed Load Assignment File, and represents the total feed load amount to be prepared at the feedmill for delivery to the specified subsequence.

In most feedmills, the actual preparation of the total feed load assignment will typically require mixing one or more separate batches of feed ration, which are accumulated in feed ration storage bin 76 disposed at an elevation above the height of the feed delivery vehicle. The preparation of each batch of feed ration occurs under the control of the feedmill computer system, using the data recorded in (i) the total load assigned field of the Feed Load Assignment File and (ii) the feed ration mixing table (supplied by the feedlot nutrition computer) and stored in the feed load assignment computer system. After a suitable number of batches have been prepared at the feedmill, they are then loaded into the assigned feed delivery vehicle for immediate delivery at the feedmill.

Figure 9A:
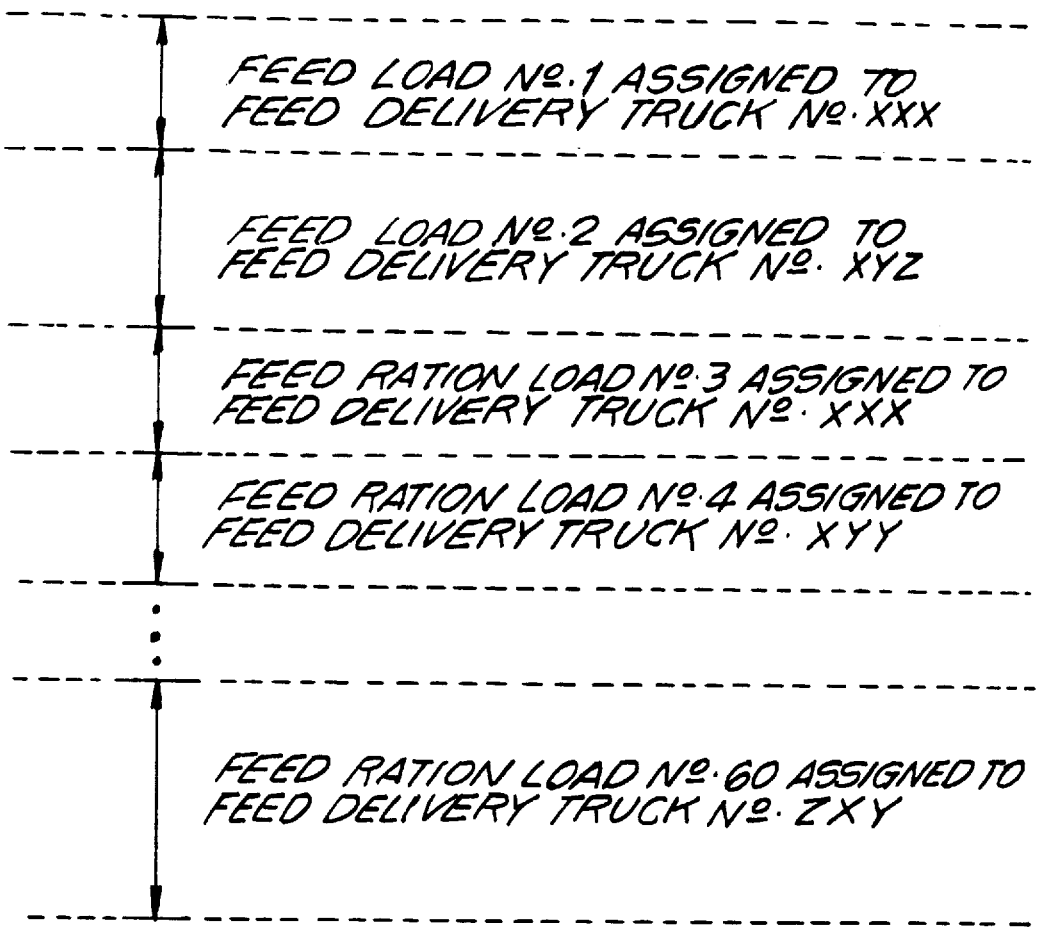
FIG. 9A is a schematic representation illustrating the steps performed by the feedmill operator during the feed load and pen subsequence assignment process.

In order to account for the amount of feed ration actually loaded into the assigned feed delivery vehicle, scale 75 associated with the feed ration mixing bin 11, transmits signals to the feedmill computer system, which after suitable processing, are converted into a measure representative of the actual weight of the feed ration loaded into the feed delivery vehicle under the control of the feedmill computer system. This actual feed load weight measurement is automatically recorded into the total feed load field arranged in column 11 of the Feed Load Assignment File. As schematically illustrated in FIG. 9A, indicated by ration code "A" in the Feed Load Assignment File, the above process is then repeated for the remainder of the pens in the prioritized pen sequence which are to be fed feed ration from the first feed ration group.

When the pens receiving feed ration from the first ration group (e.g. indicated ration code "A") have all been assigned to a dispatched feed delivery vehicle, the feedmill operator then proceeds to assign a pen subsequence to the next available feed delivery vehicle in the feedlot. This time, however, a load of feed ration from a second ration group (e.g. ration code "B") will be assigned using the above-described procedure and the visually displayed Feed Load/Pen Subsequence Allocation File shown in FIG. 9B. Typically, a number of feed load assignments will be required to deliver the feed ration assignments to all of the pens contained within the second feed ration group. When the pens associated with the second ration group have been assigned and batches of feed prepared and loaded into the assigned feed delivery vehicles, the feedmill operator then proceeds to assign pen subsequences to the next set of available feed delivery vehicles. Typically, after pen subsequences associated with each of the feed ration groups have been dispatched there will be subsequent pen subsequences associated with the feed ration groups. These subsequent pen subsequences are then assigned to feed delivery vehicles in a manner described above until all of the pens along the prioritized pen feeding route have been dispatched to a feed delivery vehicle. At the end of this process, a copy of the completed Feed Load Assignment File is transmitted from the feedmill computer system to the feedlot management computer system for performance analysis of the feed load assignment process which is to be conducted at the end of the last feeding cycle of the day.

In FIG. 10, a schematic representation of the Feed Ration Dispensed File is shown for the first feeding cycle. At the beginning of each feeding cycle, each feed delivery vehicle computer system creates a Feed Ration Dispensed File utilizing data contained in the prioritized Feed Ration Delivery File received from the feedbunk reader computer system. As shown, each Feed Ration Dispensed File comprises several types of data fields; namely: pen number fields arranged in their prioritized order along column 1; the feed ration type fields arranged in column 2; feed ration assignment fields arranged in column 3; and feed ration dispensed fields arranged in column 4. In its initial state, each feed ration type field contains a feed ration code and the feed ration assignment field contains a feed ration amount assigned by the feedbunk reader. Notably, however, the actual feed ration dispensed field is initially vacant for receipt of an actual weight measurement produced by scale 52 aboard the associated feed delivery vehicle, that is, when feed is being dispensed into the feedbunk of a particular pen along the pen sequence assigned to the vehicle.

In the preferred embodiment, several pen number and associated fields in the Feed Ration Dispensed File are simultaneously displayable on the LCD screen of each feed delivery vehicle computer system. During the feed ration delivery process, the driver can then record the weight of feed ration being dispensed into a selected feed ration dispensed field by simply moving the display cursor to the corresponding pen number in the Feed Ration Dispensed File. In this way, the driver is accorded some flexibility in the relative order in which he delivers feed to pens along an assigned pen sequence. It is understood, however, that other suitable ways of displaying the fields of the Feed Ration Dispensed File may be implemented. At the end of each feeding cycle, each feed delivering computer system transmits its completed Feed Ration Dispensed File to the feedbunk reading computer system and also preferably the feedlot management computer system.

In FIG. 11, a schematic representation of the Cattle Movement/Death File for a particular day, is shown. Typically, this file is created in the feedbunk reading computer system on a daily basis and is updated during the day by the feedbunk reader as he collects information relating to cattle movement and death while reading the feedbunks in the feedlot. At the end of the day, this file is transmitted to the feedlot management computer. Then, the feedlot management computer system transmits the Cattle Movement/Death File to the financial accounting computer system so that daily feed ration charges are computed on the basis of the total number of living cattle of each owner. The Cattle Movement/Death File is also utilized to update the Cattle Movement History file maintained within the feedlot management computer system. As illustrated in FIG. 11, this file contains a number of data fields, namely: the cattle movement type field in which a code is recorded to indicate a regular pen movement event, or cattle death within a pen in the feedlot; the lot number field in which the lot number of the cattle being moved (or a cattle death) is recorded; the pen number field in which the number of the pen from which cattle are moved (or in which cattle death has occurred) is recorded; the lot number field in which the lot number of moved cattle is recorded; the pen number field in which the (pen) number of the pen to which the cattle were moved is recorded; and the head count field in which the number of cattle being moved (or cattle deaths) are recorded. Using the fields provided in the Cattle Movement/Death File, it is thus possible to record cattle deaths and all other types of cattle movement within the feedlot, including the receipt of new cattle.

In FIG. 12, a schematic representation of the Cattle Movement History File is shown. This file is created and maintained in the feedlot management computer system and a copy of this updated file is transmitted to the feedbunk reading computer system prior to each feedbunk reading cycle. The Cattle Movement History File contains a historical account of all cattle movements made within the feedlot over a time period equal in length to the historical time period of the Feed Ration Consumption History File described hereinabove. The Cattle Movement History File is essential to accurately interpret the Feed Ration Consumption History File during the feed ration assignment process. To appreciate the importance of this file, it will be helpful to discuss briefly how feed ration assignments are typically made for the pens in the feedlot.

Prior to the first reading or feeding cycle, the Feed Ration Assignment Computation Routine is run within the feedbunk reading computer system to compute the initial total amount of feed ration to be assigned to each particular pen. This computed amount is based on (i) the prior consumption history of the cattle in the pen, and (ii) a cattle weight gain model simulated within the feedbunk reading computer system. As cattle are often moved from one pen to another pen in the feedlot during the course of their stay in the feedlot, it is essential that the Feed Ration Assignment Computation Routine have access to cattle movement and death data contained within the Cattle Movement History File. In this way, when the Feed Ration Assignment Computation Routine focuses on the prior consumption history of a particular pen, it can account for the cattle movement into and out of the pen over the historical consumption period being considered, thus reaching a total feed ration assignment which is more accurately reflected by the cattle weight gain simulation model.

In FIG. 13, a schematic illustration of the Feed Ration Charge File is shown. After completion of the last feeding cycle and receipt of all Feed Ration Dispensed Files are received by the feedlot management computer system from the feed delivery vehicle computer systems, the feedlot management computer system creates the feed ration charge file and then transmit it to the financial accounting computation system for accounting and billing purposes. As illustrated, all of the fields and data contained in the Feed Ration Charge File are obtained from the Pen Master File after the Pen Master File has been updated using the Feed Ration Dispensed Files received from the feed delivery vehicle computer systems in the network. The purpose of Feed Ration Charge File is to gather together all the necessary data required by the financial accounting computer system to compute the total charges incurred by each cattle owner for the amount and type of feed ration actually delivered to (i.e. fed) his cattle during a specified day.

As illustrated in FIG. 13, the Feed Ration Charge File comprises a number of data fields and the data therein selected from the Pen Master File, namely: pen number fields arranged in column 1; associated lot number fields arranged in column 2; associated ration type fields arranged in column 3; and the sequence of associated feed ration dispensed fields arranged in column 4 of the Feed Ration Charge File. In column 5, the associated feed ration cost/pound fields are arranged, while the total ration cost/pen fields are arranged in column 6. Typically, the cost per pound for each type of ration will differ, and thus a different cost/pound figure will be recorded in the ration cost/pound field associated with each pen in the feedlot.

Having described the overall structure and function of the feedlot computer network and the file structures utilized therein, it is appropriate at this juncture to describe the feed ration assignment and delivery of the present invention, with reference to FIGS. 14A through 14E.

Figure 14:
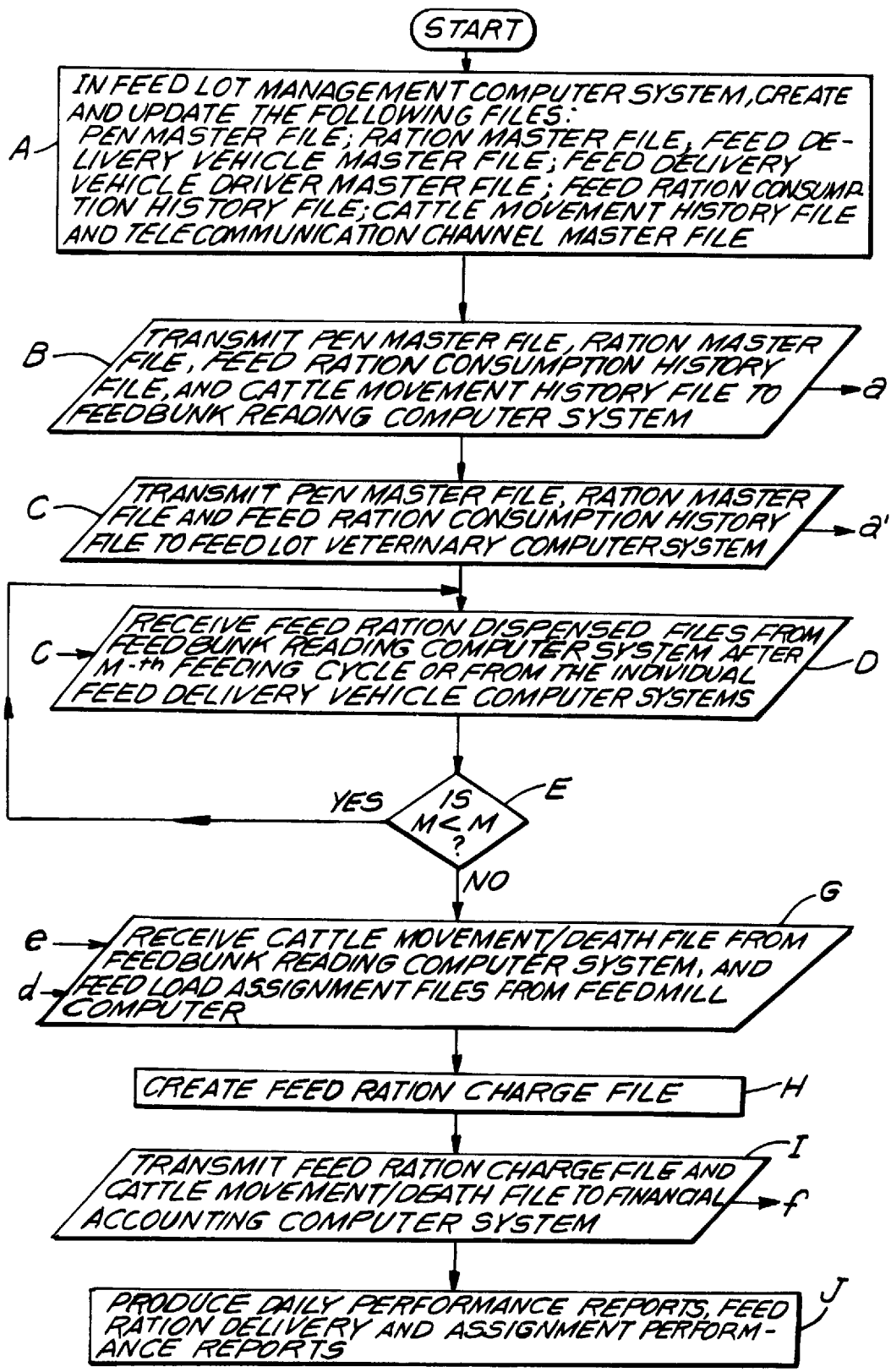
FIG. 14 is a high level flow chart illustrating the program performed by the feedlot management computer system during the feed ration assignment and delivery process of the present invention.

In FIG. 14, there is shown a high-level flow chart which illustrates the programmed operation of the feedbunk management computer system during the feed ration assignment and delivery process of the present invention. As indicated at Block A, prior to the first feedbunk reading cycle of the day, the feedlot manager utilizes the feedlot management computer system to update a number of files maintained therein. This file updating process may be carried out as follows.

The feedlot management computer system uses the data contained in the Feed Ration Dispensed Files from the last feeding cycle of the previous day, to update the Feed Ration Dispensed Fields associated with the last feeding cycle in Pen Master File of that day. The feedlot management computer system then uses the data contained in the Cattle Movement/Death File from the previous day, to update the head count and lot numbers fields in the Pen Master File of that day. Thereafter, the feedlot management computer system uses the data contained in the Pen Master File to update the Feed Ration Consumption File History File. Then, any new data available to the feedlot manager is then used to update the files associated with the feed delivery vehicles and drives in the feedlot. Notably, these files will also be updated throughout the day as required and then retransmitted to the feedmill computer system for storage and use during the feed load and pen subsequences assignment process at the feedmill.

From time to time, the feedlot nutritionist may decide to change or modify either the types of feed ration (and/or the ingredients contained therein) which are fed to the cattle in the feedlot. When such a decision has been made, a Feed Ration Change File is created within the feedlot nutrition computer system by the nutritionist, and is then transmitted to the feedlot management computer system over the wireless telecommunication link established between RF transceivers 123 and 94. When such a transmission arrives at the feedlot management computer system, a "file received" indication will be preferably displayed on the menu-display screen thereof to cue the feedlot manager to update the Feed Ration Master File using data contained in the received Feed Ration Change File.

If for any reason there is a change in the number or channel frequency assigned to any of the computer systems in the network, the feedlot management computer system updates the data contained in the Telecommunication Channel Master File, shown in FIG. 7. Preferably the updating process occurs at the beginning of each new day, but may also occur at any time during the day as required.

When all files have been updated, the feedlot management computer system then transmits a copy of the Pen Master File, the Ration Master File, the Telecommunication Channel Master File, the Feed Ration Consumption History File and the Cattle Movement History File to the feedbunk reading computer system, as indicated at Block B in FIG. 14A. Shortly thereafter, the feedlot management computer system transmits a copy of the Pen Master File, the Ration Master File, and the Feed Ration Consumption History File to the feedlot veterinary computer system, as indicated at Block C in FIG. 14.

At this stage of the process, the feedbunk reading computer system becomes active. Specifically, as indicated at Block A in FIG. 14B, the feedbunk reading computer system receives and stores in memory 24, the Pen Master File, the Ration Master File, the Feed Ration Consumption History File, and the Cattle Movement History file transmitted by the feedlot management computer system over the wireless telecommunication link established between RF transceivers 35 and 95. Then, as indicated at lock B, the feedbunk reader interacts with the feedbunk reading computer system to call up the Feed Ration Assignment Computation Routine. At this stage of the process, the Feed Ration Assignment Computation Routine Accesses data from (i) the Feed Ration Consumption History File, (ii) the Cattle Movement History File, and (iii) the cattle weight gain model, in order to compute daily feed ration assignments for each pen in the feedlot. At this stage, the total number of feeding cycles to be executed during the day is stored in the feedbunk reading computer system.

In general, the feedbunk reading may read the feedbunk of each pen in the feedlot once prior to the first feeding cycle, or prior to each feeding cycle. In the illustrative embodiment, it is assumed that feedbunk reading occurs before each feeding cycle. Thus, as indicated at Block C in FIG. 15A the feedbunk reader displays the fields associated with the beginning pen numbers listed in the Pen Master File, and then drives to the pen indicated by pen sequence number "1". At this pen, the feedbunk reader visually inspects the condition of (i) the associated feedbunk, (ii) the cattle in the pen, and (iii) the pen itself. On the basis of data collected during this feedbunk reading process, the feedbunk reader enters a suitable feeding priority code in the feeding priority code field associated with pen sequence No. 1. If the feedbunk reader determines that an additional amount of ration should be assigned to the pen, e.g. because the feedbunk is "licked clean", he may change the computed feed ration assignment recorded in the feed ration assignment field to a value which reflects the desired amount to be fed to the pen during the first feeding cycle.

Figure 15A:
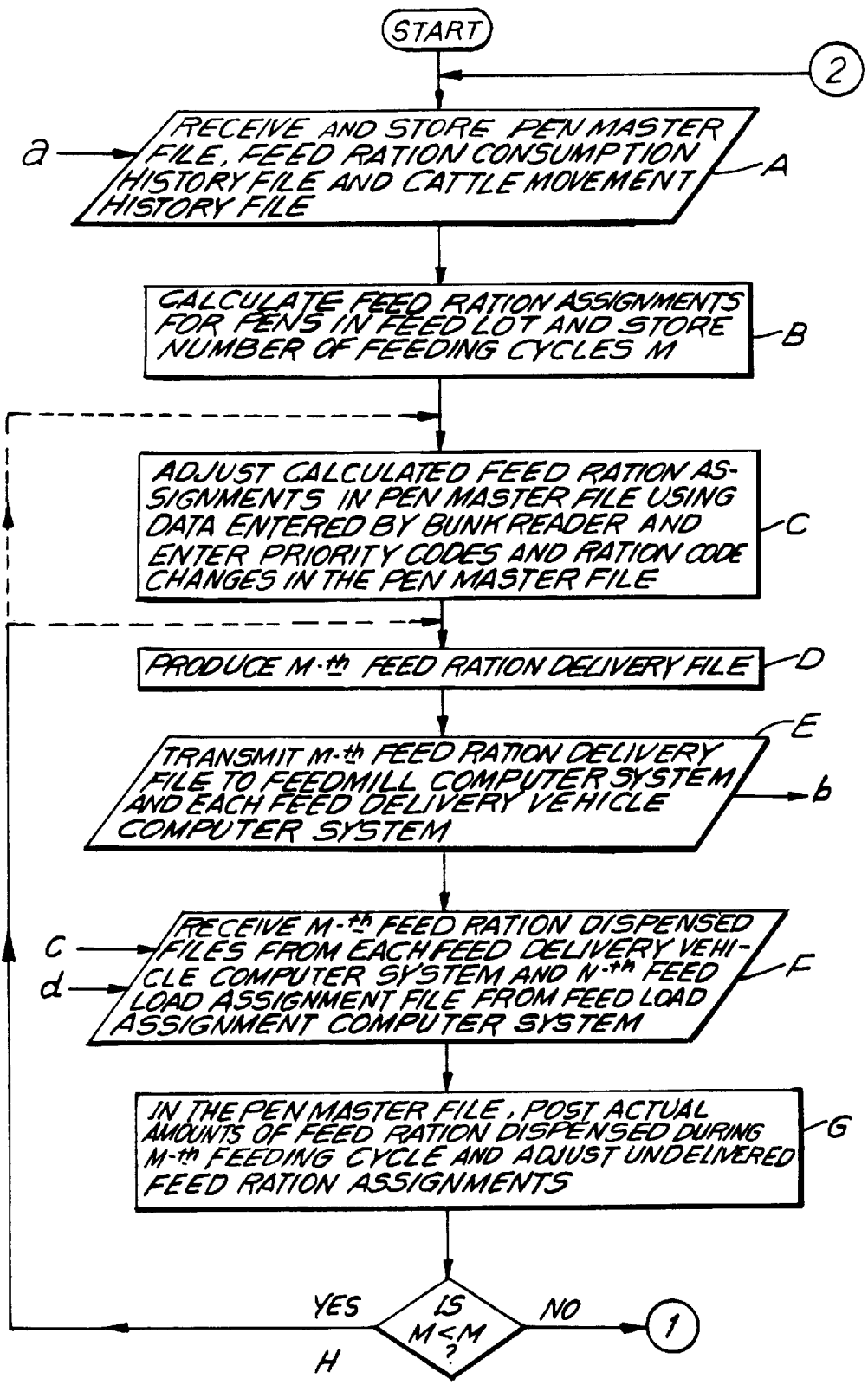
FIGS. 15A and 15B, taken together, provide a high level flow chart illustrating the program performed by the feedbunk reading computer system during the feed ration assignment and delivery method of the present invention.

As indicated at Block D of FIG. 15A, the feedlot management computer system uses the data in the Pen Master File to create the Feed Ration Delivery File for the first feeding cycle. Then as indicated at Block E, the feedlot management computer system transmits a copy of the Feed Ration Delivery File to (i) feedmill computer system over the wireless telecommunication link established between RF transceivers 35 and 72, and (2) each of the available feed delivery vehicle computer systems over the wireless telecommunication links established between RF transceivers 35 and 50. There may, however, be instances when the feedbunk reading computer system is rendered disabled after the Feed Ration Delivery File has been transmitted to the feedmill computer system. In such cases, the feedmill computer system may transmit the Feed Ration Delivery File to each of the feed delivery vehicle computer systems over the wireless telecommunication links established between RF transceivers 72 and 50. As will become more apparent hereinafter, the telecommunication links established among the feedmill and feed delivery vehicle computer systems are useful not only in emergency situations where the feedbunk reading computer system is disabled, but also in applications where it is desired to further lessen the degree of involvement of the feedbunk reader in the feed delivery process.

Figure 16A:
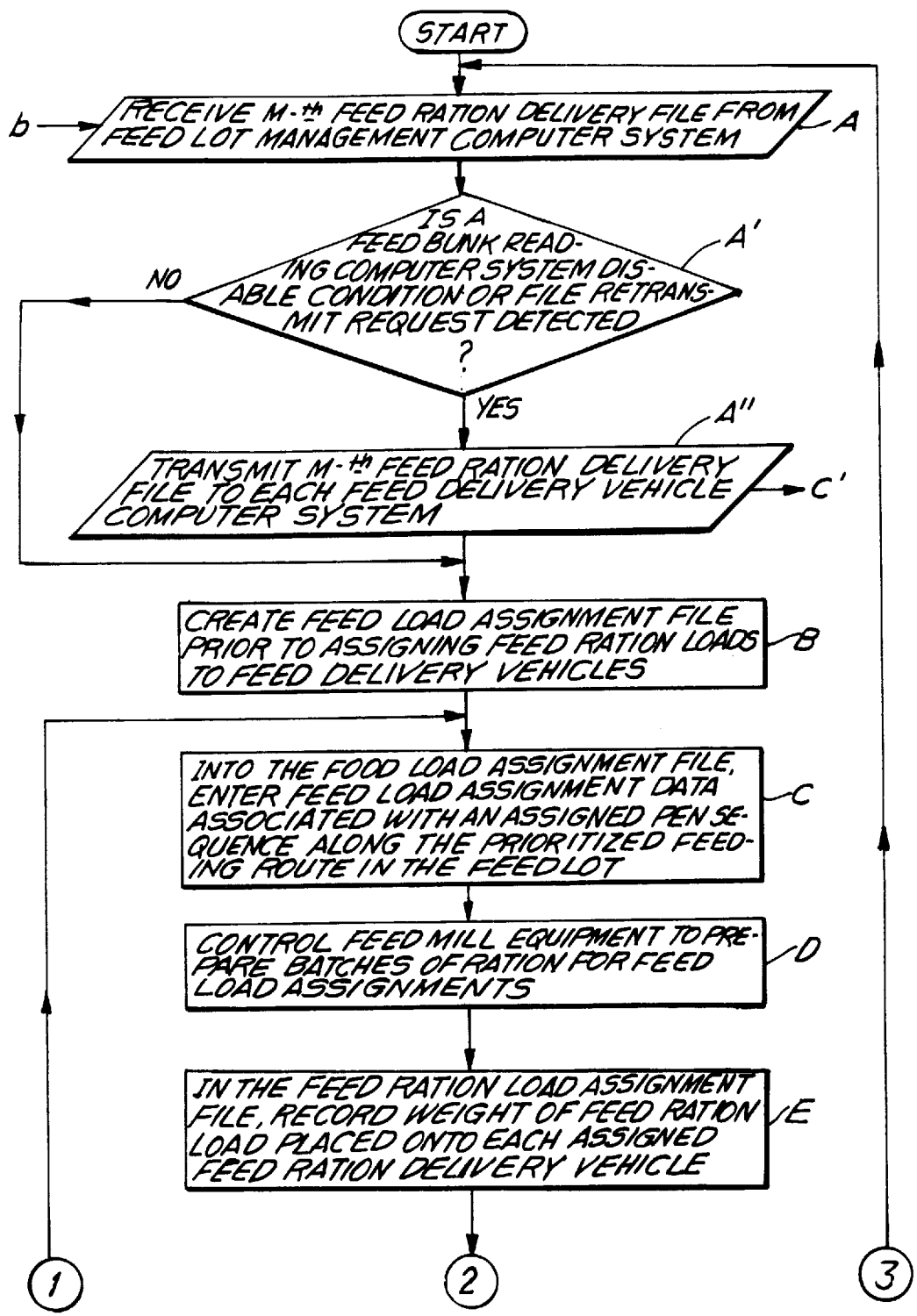
FIGS. 16A and 16B, taken together, provide a high level flow chart illustrating the program performed by the feedmill computer system during the feed ration assignment and delivery method of the present invention.
Figure 17:
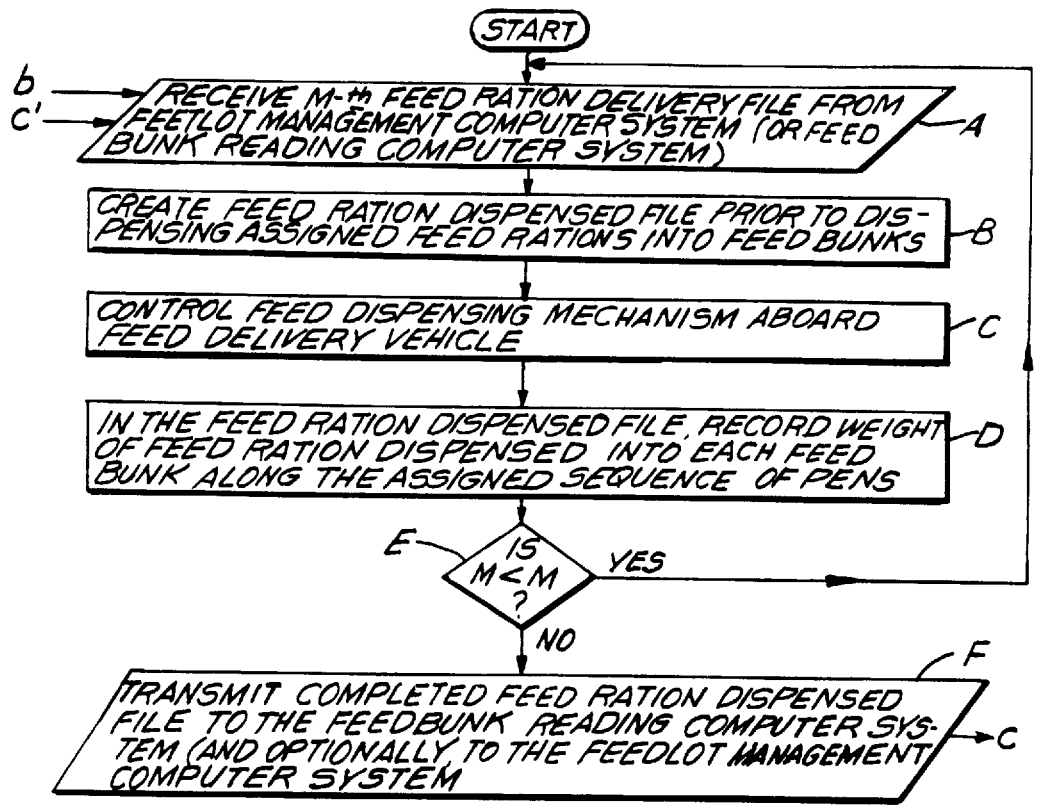
FIG. 17 is a high level flow chart illustrating the program performed by each feed ration delivery computer system during the feed ration assignment and delivery method of the present invention.

As indicated at Block A in FIGS. 16A and 17, the feedmill computer system and each feed delivery vehicle computer system receives the transmitted Feed Ration Delivery File for the first feeding cycle. The feedmill computer system then proceeds to carry out the feed load assignment and preparation process described hereinabove. Specifically, as indicated at Block A' in FIG. 16A, the feedmill computer system determines whether the feedbunk reading computer system is disabled or otherwise desires the feedmill computer system to transmit its received copy of the Feed Ration Delivery File, to each of the feed delivery vehicle computer systems in the computer network. This condition or request can be simply determined by the feedmill computer system reading the request/disable condition (for file retransmission) field arranged in the upper corner portion of the received Feed Ration Delivery File, as illustrated in FIG. 8. If the feedmill computer system determines such a condition or request, it then retransmits a copy of the Feed Ration Delivery File to each of the feed delivery computer systems as indicated at Block A" in FIG. 16A.

As indicated at Block B in FIG. 16A, the feedmill computer system then uses the contained in the Feed Ration Delivery File for the first feeding cycle in order to create a Feed Load Assignment File for the first feeding cycle. Thereafter, at Block C, the feedmill operator sequentially assigns a subsequence of pens and a load of feed to an available feed delivery vehicle in the feedlot, and then enters the associated feed load and pen subsequence assignment data into the Feed Load Assignment File.

Figure 16B:
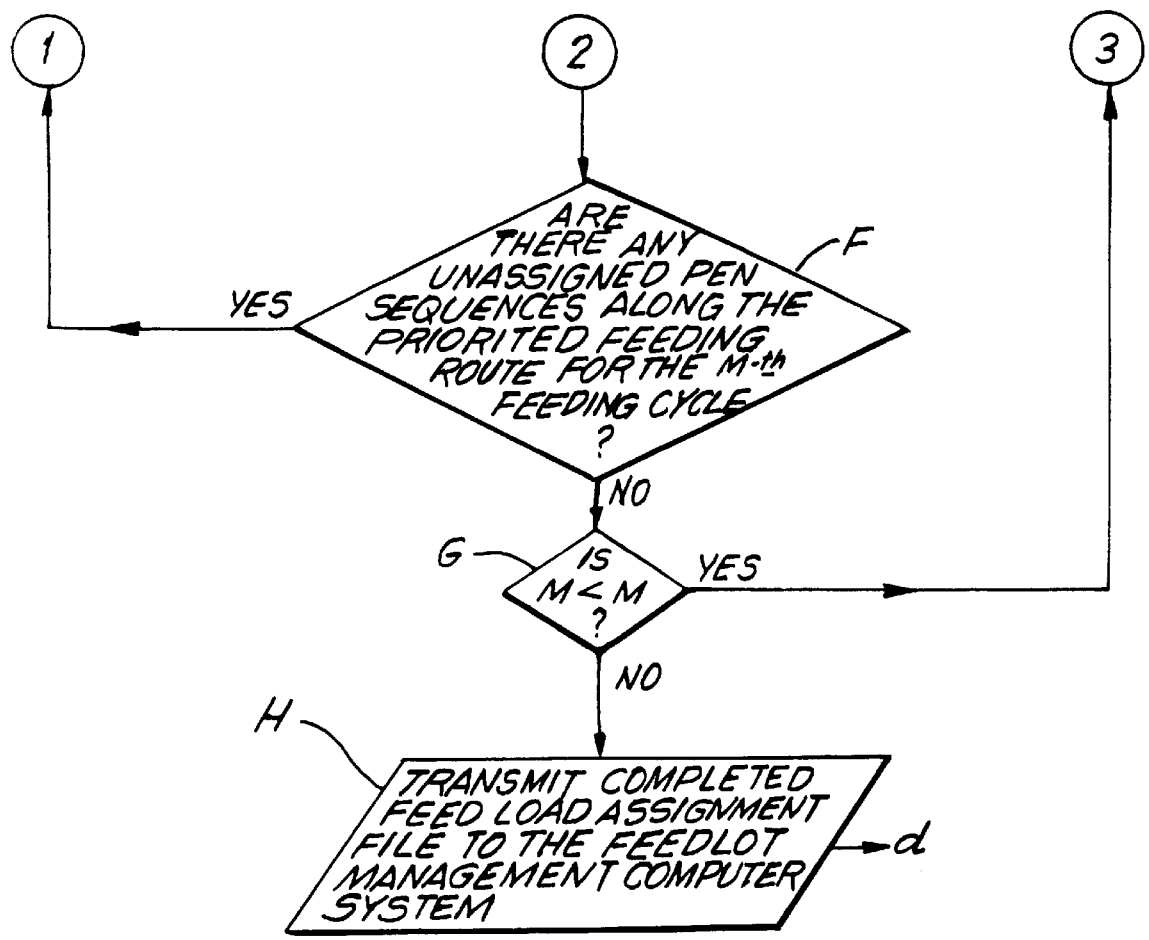

As indicated at Blocks D and E in FIG. 16A, the feedmill computer system controls feed ingredient metering and mixing equipment 11 during feed batch preparation operations at the feedmill, and then records the actual weight of the feed batches or portions thereof loaded onto the dispatched feed delivery vehicle. If at Block F in FIG. 16B, there are unassigned pen sequences along the prioritized feeding route for the m-th feeding cycle, the feedmill computer systems returns to Block C and performs the operations in the loop defined by Block C, D, E, C, for each unassigned pen sequence. When the feed load preparation and loading process is completed for the last pen subsequence along the prioritized feeding route, the operations in the program loop defined by Blocks A, B, C, D, E, F, G, A are performed once again for the (m+1)th feeding cycle of the day. When, as indicated at Block G, the feed load, assignment, preparation and loading process is completed for the last feeding cycle (i.e. m=M), the feedmill computer system transmits the M Feed Load Assignment Files to the feedlot management computer system. As will be described in greater detail hereinafter, the data contained in the M Feed Load Assignment Files can be used by the feedlot management computer system to produce performance reports regarding feed load and pen subsequence assignment operations performed by the feedmill operator during the course of the day.

At Blocks A through E of FIG. 17, the programmed operations performed by each feed delivery vehicle computer system are schematically illustrated. As indicated at Block B, upon reception of the Feed Ration Delivery File for the first feeding cycle, each feed delivery vehicle computer system uses the data contained therein to create a Feed Ration Dispensed File for the first feeding cycle. To deliver the assigned feed rations specified in this file, the driver (i) visually displays the first several pens having the highest feeding priority listed in the Feed Ration Dispensed File, (ii) drives his feed delivery vehicle adjacent the first pen listed on his assigned pen subsequence, and (iii) then reads from the displayed Feed Ration Dispensed File, the amount of feed ration which has been assigned to the pen. As the feed delivery vehicle is driven alongside the pen's feedbunk, the Uniform Feed Delivery Control Routine in the feed delivery vehicle computer system controls feed dispensing equipment 55 aboard the vehicle so as to uniformly dispense feed along the length of the feedbunk as hereinbefore described. Simultaneously, the weight of the dispensed feed ration is automatically recorded in the feed dispensed field of the Feed Ration Dispensed File being displayed on LCD panel 43. When the amount of dispensed feed approaches the assigned amount of feed ration, preferably an audible indication is sounded from the feed delivery vehicle computer system, alerting the driver to either stop dispensing feed, or deliver additional or less feed ration than assigned, based on the judgment and field experience of the driver. When the feed dispensing process is completed, the final measured amount of dispensed feed ration is recorded in the feed ration dispensed field of the Feed Ration Dispensed File. Thereafter the driver proceeds to the next pen on his assigned pen subsequence and delivers feed ration to the feedbunk thereof, following essentially the same basic steps in the above described delivery process.

When each feed delivery vehicle driver completes delivering feed to his assigned subsequence of pens, he returns to the feedmill to assist in the delivery of additional feed loads which are being sequentially assigned on a vehicle availability and load capacity basis. When delivery of feed to all pens along the prioritized feeding route is completed, the Feed Ration Dispensed File in each feed delivery vehicle computer system is transmitted to the feedlot management computer system, as indicated at Block F in FIG. 17.

At Block F of FIG. 15A, the feedbunk reading computer system receives the transmitted Feed Ration Dispensed Files. Then, as indicated at Block G, the feedbunk reading computer system posts (i.e. records) the feed dispensed data from the Feed Ration Dispensed Files into the corresponding feed dispensed fields in the Pen Master File. Immediately thereafter, the feedbunk reading computer system adjusts the feed ration assignments posted for each pen during the second (and perhaps third) feeding cycles. This adjustment process is carried out on the basis of the actual amount of feed ration dispensed to the pen during the previous feeding cycle. In essence, this process involves decreasing or increasing future feed ration assignments posted for each pen using the available feed ration dispensed data collected during the previous feeding cycle. In this way, the feedbunk reader can indirectly control the actual amount of feed ration delivered to each head of cattle at the end of each day, thus ensuring compliance with the feeding program.

As indicated at Block H in FIG. 14B, the feedbunk reading computer system can then either return to Block D and produce the Feed Ration Delivery File for the second feeding cycle, or return to Block C where it can function in the second feedbunk reading and ration adjustment process, as hereinbefore described. In the preferred embodiment, the program loop defined by Blocks C, D, E, F, G, H, I, J are repeated up to M-1 (or 2) times, in order to carry out the steps involved at the feedbunk reading computer system during the first, second and third feeding cycles. During each traverse through the program loop, the steps recited in FIGS. 16A, 16B and 17 will be repeated by the feedmill and feed delivery vehicle computer systems during the execution of each feeding cycle.

Figure 15B:
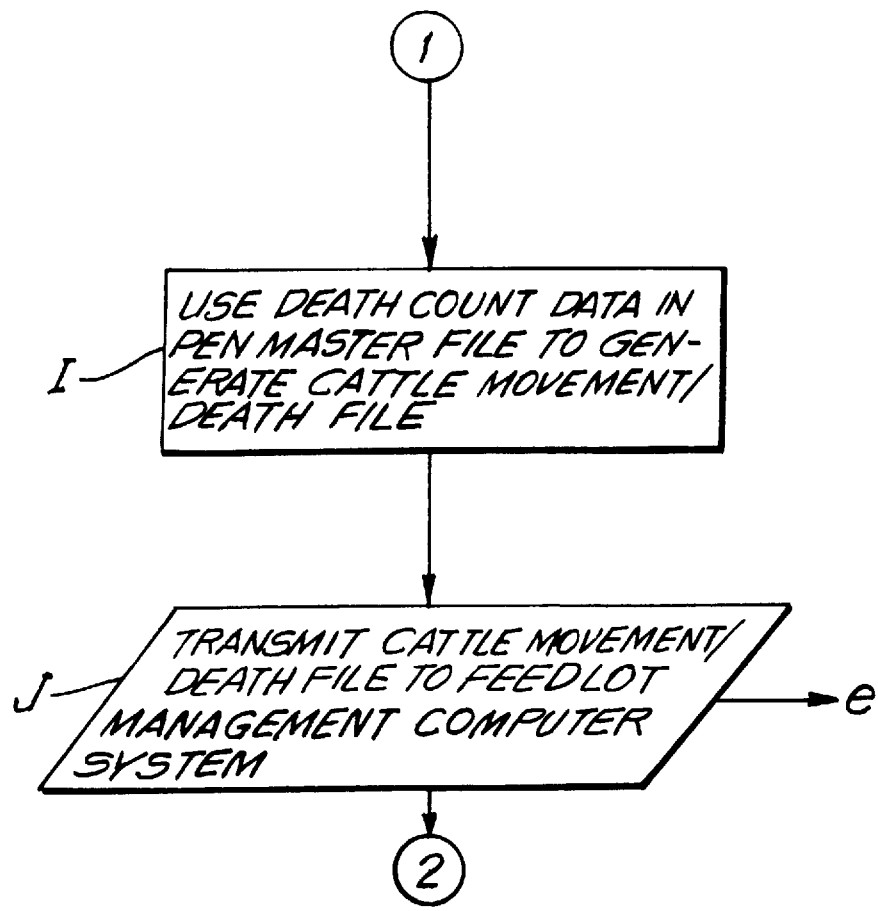

At Block I in FIG. 15B, the feedbunk reading computer system updates the Cattle Movement Death File uses the data contained in the cattle death count field in the updated Pen Master File. Then at Block J, the feedbunk reading computer system transmits both the Feed Ration Charge File and updated Cattle Movement/Death File to the feedlot management computer system.

Figure 18:
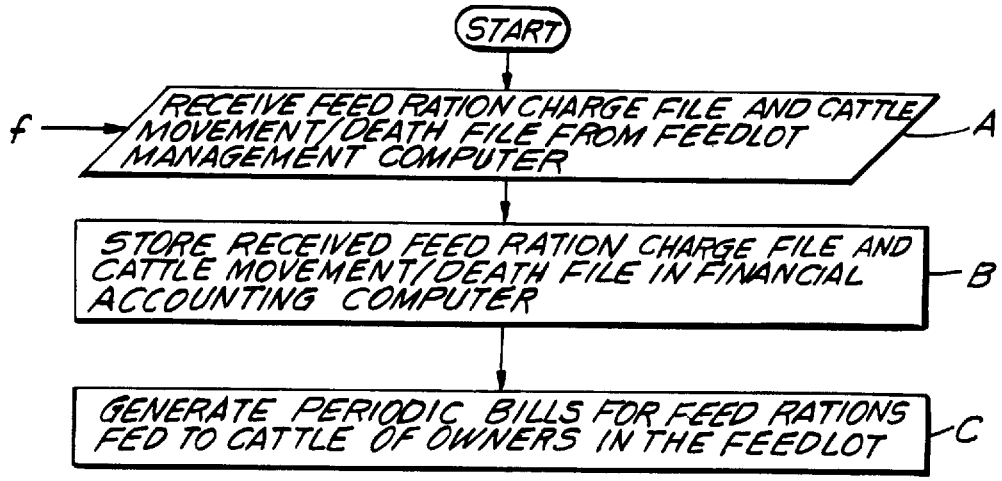
FIG. 18 is a high level flow chart illustrating the program performed by the financial accounting/billing computer system during the feed ration assignment and delivery method of the present invention.

As indicated at Block G in FIG. 14, the feedlot management computer system receives the Feed Ration Dispensed File (for the (m=M)th feeding cycle) and the Cattle Movement/Death File from the feedbunk reading computer system. At Block H in FIG. 14, the feedlot management computer system uses the feed ration dispensed data and death count data from above files to create the Feed Ration Charge (or Audit) File. Thereafter at Block I, the feedlot management computer system transmits the Feed Ration Charge File and Cattle Movement/Death File to the financial accounting computer system. At Blocks A and B in FIG. 18, the financial accounting computer system receives and stores the transmitted Feed Ration Charge File and Cattle Movement/Death Files. Then at Block C in FIG. 18, the financial accounting computer system uses the feed ration dispensed data, the feed ration cost data and the cattle death count data contained in these files, respectively, in order to compute the charge incurred by each cattle owner for the feed rations fed to their cattle during the day. These charge figures are summed up for a particular time period (e.g. a week) and printed in the form of bill, bearing other data which is of assistance in helping each cattle owner determine a number of important figures, such as the feeding cost incurred per head of cattle, the number of days on a particular ration and the like. As is well known in the art, such figures are useful in computing break-even prices and margins of return.

At Block J in FIG. 14, the feedlot management computer system compares, for each pen, the data in the Pen Master File in order to evaluate the performance of the drivers of the feed ration delivery vehicles during the executed feeding cycles. Preferably at this stage, the feedlot management computer system also compares, for each feed load assignment, the data contained in corresponding feed load assignment and dispensed fields in the Feed Load Assignment File in order to evaluate the performance of the feedmill operator during executed feed load assignment operations. From such data analyses, the feedlot management computer system then produces daily reports which provide a statistical measure of the deviation between the assigned (desired) feed rations and the actual feed rations dispensed to each pen in the feedlot. Also produced are statistical measures of the deviation between assigned feed loads and actually dispensed feed loads.

Having described the illustrative embodiment of the present invention, several modifications come to mind.

In the illustrative embodiment, a single computer system has been disclosed for running both (i) feed load assignment related routines and (ii) feed batch preparation and loading related routines. In alternative embodiments of the present inventions, individual computer systems may be installed at the feedmill for running these two distinct types of computer software without departing from the spirit of the present invention. In such embodiments, the individual computer systems at the feedmill will be suitably interfaced with each other, and also interfaceable with the other computer systems in the feedlot computer network.

In the illustrative embodiment of the present invention, two distinct mechanisms have been disclosed for facilitating data communications among the computer systems in the feedlot computer network. The first data communication mechanism involves establishing a physical data communication interface among pairs of computer systems between which data files can be transferred at particular stages of the feed ration assignment and delivery process. The second data communication mechanism involves establishing an electromagnetic (e.g. RF) type data communication interface (i.e. link) among pairs of computer systems, between which data files can be transferred at particular stages of the feed ration assignment and delivery process.

In an alternative embodiment, each computer system in the feedlot computer network is interfaced within a commercially established satellite telecommunication network operating in the microwave (MW) region of the electromagnetic spectrum. In such an alternative embodiment, each computer system in the network preferably includes a multichannel satellite uplink/downlink transceiver, which is used to establish wireless data communication links among any number of computer systems in the network, for purposes of transferring data files over selected channels.

Figure 19:
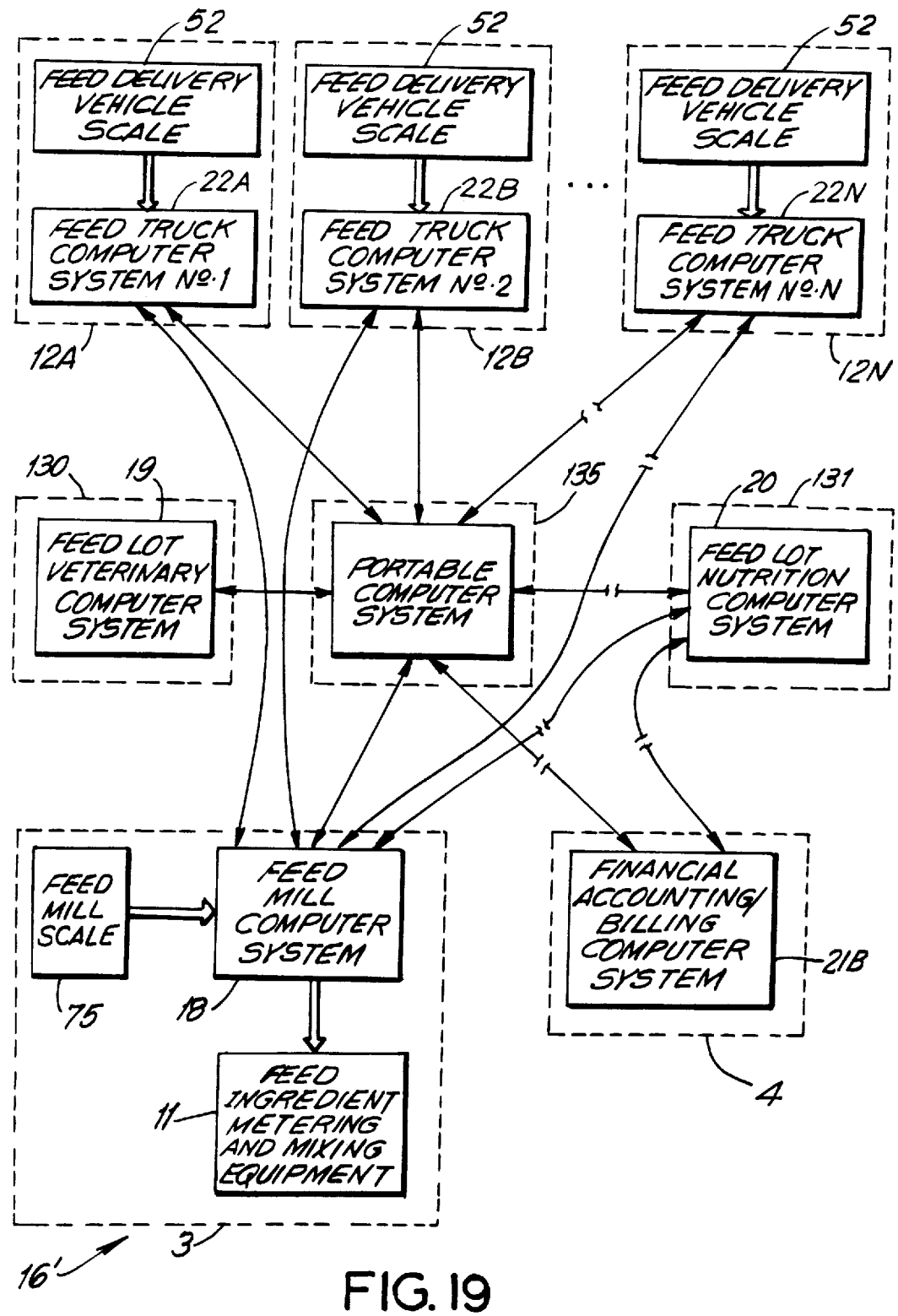
FIG. 19 is a block diagram of an alternative embodiment of the feedlot computer network of the present invention.

In the feedlot computer network of FIG. 2, separate computer systems have been disclosed for performing the above-described feedbunk reading and feedlot management functions. However, in an alternative embodiment of the present invention, the functions implemented by the feedlot management computer system and the feedbunk reading computer system may be implemented in a single portable computer system 135 carried aboard vehicle 15 of the feedbunk reader. In this alternative embodiment of the present invention, the feedbunk reader will typically perform the general responsibilities of the feedlot manager, as well as those of the feedbunk reader, and the feedbunk computer network may have the configuration schematically illustrated in FIG. 19. In feedlot computer network 16, the data files created and used by the feedmill computer system, the feed delivery vehicle computer systems, the feedlot veterinary computer system, the feedlot nutrition computer system and the financial computer system will be substantially the same as those data files created and used in feedlot computer network 16. The major difference is that the data files created and used by the feedlot management computer system and the feedbunk reading computer system in feedlot computer network 16, will be created and used in portable computer system 135 of feedlot computer network 16'.

While the preferred embodiments of the system and method of the present invention have been described in detail, it will be appreciated that numerous variations and modifications of the present invention will occur to persons skilled in the art. All such variations and modifications shall constitute the present invention as defined by scope and spirit of the appended claims.

What is claimed is:

1. A feedlot computer network installation for managing feedlot operations within a feedlot having a plurality of animal pens each having a feedbunk and containing one or more animals for feeding and health maintenance, said feedlot computer network installation comprising:

(A) a veterinarian computer system, installed aboard a veterinarian vehicle transportable to each said animal pen in said feedlot, said veterinarian computer system including means for producing, storing and displaying animal health data indicative of the state of health of the animals in said animal pens;

(B) a feedbunk reading computer system, installed aboard a feedbunk reading vehicle transportable to each said animal pen in said feedlot, said feedbunk reading computer system including means for receiving, storing and displaying said animal health data and feed ration dispensed data, and means for producing, storing and displaying feed ration delivery data, said feed ration delivery data specifying the assigned amount of feed ration to be delivered to the feedbunks associated with a plurality of animal pens along a feeding route during a specified number of feeding cycles to be executed within a predetermined time period, and said feed ration dispensed data indicating the actual amount of feed ration delivered to the feedbunks of said animal pens during each said specified feeding cycle;

(C) a plurality of feed delivery vehicle computer systems, each said feed delivery vehicle computer system being installed aboard a feed delivery vehicle transportable to each said animal pen in said feedlot and having storage means for storing an assigned feed load, and feed metering means for metering the actual amount of feed ration delivered to the feedbunks associated with said specified sequence of animal pens, and data producing means for producing said feed ration dispensed data indicative of the actual amount of feed ration delivered to said feedbunks, each said feed delivery vehicle computer system being operatable by a feed delivery vehicle operator assigned to said feed delivery vehicle, and having means for receiving, storing and displaying said feed ration delivery data provided from said feedbunk reading computer system, and means for receiving said feed ration dispensed data produced from said metering means aboard said feed delivery vehicle;

(D) a feedmill computer system, installed at a feedmill in said feedlot and having means for receiving, storing and displaying said feed ration delivery data produced from said feedbunk reading computer system;

(E) a feedlot management computer system, installed aboard a feedlot management vehicle team, for receiving, storing and displaying said feed ration delivery data, said feed ration dispensed data and said animal health data, for use by a feedlot manager of said feedlot; and (F) a digital data communications system integrated with said feedlot computer network, for transferring digital data files among said feedbunk reading computer system, said feedmill computer system, said plurality of feed delivery vehicle computer systems, said feedlot management computer system and said feedmill computer system, wherein said digital data file contain said feed ration delivery data, said animal health data and said feed ration dispensed data.

2. The feedbunk computer network installation of claim 1, wherein said digital data communication system comprises a wireless data communication for transferring said digital data files among said feedbunk reading computer system, said feedmill computer system, said plurality of feed delivery vehicle computer systems, said feedlot management computer system and said feedmill computer system, by way of electromagnetic wave transmission.

3. The feedbunk computer network installation of claim 2, which further comprises a billing computer system operationally installed at a central office in said feedlot, for processing said feed ration delivered data and producing feed ration billing data indicative of the financial cost associated with the actual amount of feed ration delivered to said feedbunks during each said specified feeding cycle.

* * * * *